(12) United States Patent
Baek et al.

(10) Patent No.: US 9,942,052 B2
(45) Date of Patent: Apr. 10, 2018

(54) METHOD AND APPARATUS FOR PROVIDING SPONSORING SERVICE BETWEEN USER EQUIPMENTS

(71) Applicant: Samsung Electronics Co., Ltd., Suwon-si (KR)

(72) Inventors: Young-Kyo Baek, Seoul (KR); Sang-Soo Jeong, Suwon-si (KR); Song-Yean Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 41 days.

(21) Appl. No.: 14/952,828

(22) Filed: Nov. 25, 2015

(65) Prior Publication Data
US 2016/0156479 A1    Jun. 2, 2016

(30) Foreign Application Priority Data
Nov. 28, 2014   (KR) .......................... 10-2014-0169152

(51) Int. Cl.
*H04W 4/14* (2009.01)
*H04W 4/24* (2009.01)
(Continued)

(52) U.S. Cl.
CPC ...... *H04L 12/1407* (2013.01); *H04L 12/1475* (2013.01); *H04L 12/1496* (2013.01);
(Continued)

(58) Field of Classification Search
CPC ............. H04L 12/1407; H04L 12/1475; H04L 12/1496; H04M 15/66; H04M 15/8083; H04M 15/8214; H04M 15/844; H04M 15/863; H04M 2215/0192; H04W 4/14; H04W 4/24
(Continued)

(56) References Cited

U.S. PATENT DOCUMENTS

2003/0071115 A1* 4/2003 Horn .................. G06Q 20/28
235/379
2007/0036312 A1* 2/2007 Cai ........................ H04M 15/00
379/126
(Continued)

FOREIGN PATENT DOCUMENTS

| KR | 2013-0065878 | 6/2013 |
| KR | 2013-0065879 | 6/2013 |
| WO | 2013142331 | 9/2013 |

OTHER PUBLICATIONS

International Search Report dated Feb. 26, 2016 corresponding to International Application No. PCT/KR2015/012854.
(Continued)

*Primary Examiner* — Nathan Taylor
(74) *Attorney, Agent, or Firm* — McAndrews, Held & Malloy, Ltd.

(57) ABSTRACT

Provided is a method by a user equipment (UE) for providing a sponsoring service in a wireless communication system, the method comprising: determining at least one UE to be provided with the sponsoring service, accessing to a server providing the sponsoring service, and registering to the server providing the sponsoring service; and transmitting a request of the sponsoring service comprising identification information of the at least one UE, to the server providing the sponsoring service.

20 Claims, 14 Drawing Sheets

(51) Int. Cl.
*H04L 12/14* (2006.01)
*H04M 15/00* (2006.01)

(52) U.S. Cl.
CPC ....... *H04M 15/66* (2013.01); *H04M 15/8083* (2013.01); *H04M 15/8214* (2013.01); *H04M 15/844* (2013.01); *H04M 15/863* (2013.01); *H04W 4/14* (2013.01); *H04W 4/24* (2013.01); *H04M 2215/0192* (2013.01)

(58) Field of Classification Search
USPC .......................................................... 455/406
See application file for complete search history.

(56) References Cited

U.S. PATENT DOCUMENTS

| | | | | |
|---|---|---|---|---|
| 2012/0096513 A1* | 4/2012 | Raleigh | ................ | H04W 24/10 726/1 |
| 2013/0031575 A1* | 1/2013 | Gallant | ............... | H04L 41/5038 725/20 |
| 2013/0066942 A1* | 3/2013 | Massey | ................... | G06F 15/16 709/203 |
| 2013/0260715 A1* | 10/2013 | Li | ....................... | H04L 12/1407 455/406 |
| 2013/0283262 A1* | 10/2013 | Rehtijarvi | ................ | G06F 8/60 717/178 |
| 2014/0094138 A1* | 4/2014 | Saker | ................... | H04L 12/1407 455/406 |
| 2014/0308918 A1* | 10/2014 | Lee | .................... | H04L 63/0807 455/406 |
| 2014/0348029 A1 | 11/2014 | Lee et al. | | |
| 2015/0044989 A1* | 2/2015 | De Foy | ............... | H04L 12/1478 455/406 |
| 2015/0242903 A1* | 8/2015 | Peebles | ............. | G06Q 30/0267 705/14.64 |

OTHER PUBLICATIONS

Written Opinion of the International Searching Authority dated Feb. 26, 2016 corresponding to International Application No. PCT/KR2015/012854.

* cited by examiner

METHOD AND APPARATUS FOR PROVIDING SPONSORING SERVICE BETWEEN USER EQUIPMENTS

CROSS-REFERENCE TO RELATED APPLICATION(S)

This application claims the benefit under 35 U.S.C. §119(a) of a Korean patent application filed on Nov. 28, 2014 in the Korean Intellectual Property Office and assigned Serial number 10-2014-0169152, the entire disclosure of which is hereby incorporated by reference.

TECHNICAL FIELD

The present disclosure relates generally to a method and apparatus for providing a sponsoring service between User Equipment (UE) or users.

BACKGROUND

Generally, wireless communication systems have been developed to provide a voice service while guaranteeing user's mobility. The wireless communication systems have expanded their service providing areas by offering a data service as well as a voice service, now evolving to provide high-speed transmission in the data service. To line with this, users have demanded higher-speed data services, and the wireless communication systems are short of resources to meet these demands. Therefore, a need exists for an enhanced wireless communication system capable of satisfying user demands.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide a method and apparatus for providing a sponsoring service for a user-designated User Equipment (UE) or UE group.

Another aspect of the present disclosure is to provide a method and apparatus for delivering sponsoring service-related information to a target UE or UE group for the sponsoring service.

Another aspect of the present disclosure is to provide a method and apparatus for modifying a charging policy of a mobile communication network based on sponsoring service-related information and applying the modified charging policy to the mobile communication network.

In accordance with an aspect of the present disclosure, there is provided a user equipment (UE) for providing a sponsoring service in a wireless communication system, the UE comprising: a controller configured to determine at least one UE to be provided with the sponsoring service, and access to a server providing the sponsoring service and register to the server providing the sponsoring service; and a transceiver configured to transmit a request of the sponsoring service comprising identification information of the at least one UE, to the server providing the sponsoring service based on a control of the controller.

In accordance with another aspect of the present disclosure, there is provided a server for providing a sponsoring service for a user equipment (UE) in a wireless communication system, the server comprising: a receiver configured to receive a request for use of sponsoring service from at least one second UE indicated by a first UE providing the sponsoring service; a controller configured to identify whether the at least one second UE may use the sponsoring service or not, if the at least one second UE may use the sponsoring service, a transmitter is configured to transmit information to request to configure a policy associated with the sponsoring service to a server configured to configure a policy, based on a control of the controller.

In accordance with another aspect of the present disclosure, there is provided a server providing service corresponding to a sponsoring service provided by a user equipment (UE) in a wireless communication system, the server comprising: a controller is configured access and register with a first UE providing the sponsoring service; a receiver is configured to receive a request of the sponsoring service from the first UE; and a transmitter is configured to transmit a request of generation notification of the sponsoring service to a second server based on a control of the controller, wherein at least one second UE, determined by the first UE, is provided with the sponsoring service.

In accordance with another aspect of the present disclosure, there is provided a method by a user equipment (UE) for providing a sponsoring service in a wireless communication system, the method comprising: determining at least one UE to be provided with the sponsoring service, accessing to a server providing the sponsoring service, and registering to the server providing the sponsoring service; and transmitting a request of the sponsoring service comprising identification information of the at least one UE, to the server providing the sponsoring service.

In accordance with another aspect of the present disclosure, there is provided a method by a server providing a sponsoring service for a user equipment (UE) in a wireless communication system, the method comprising: receiving a request for use of sponsoring service from at least one second UE indicated by a first UE providing the sponsoring service; identifying whether the at least one second UE may use the sponsoring service or not, and if the at least one second UE may use the sponsoring service, transmitting information to request to configure a policy associated with the sponsoring service to a server configured to configure a policy.

In accordance with another aspect of the present disclosure, there is provided a method of a server providing service corresponding to a sponsoring service provided by a user equipment (UE) in a wireless communication system, the method comprising: accessing and registering with a first UE providing the sponsoring service; receiving a request of the sponsoring service from the first UE; and transmitting a request of generation notification of the sponsoring service to a second server, wherein at least one second UE, determined by the first UE, is provided with the sponsoring service.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
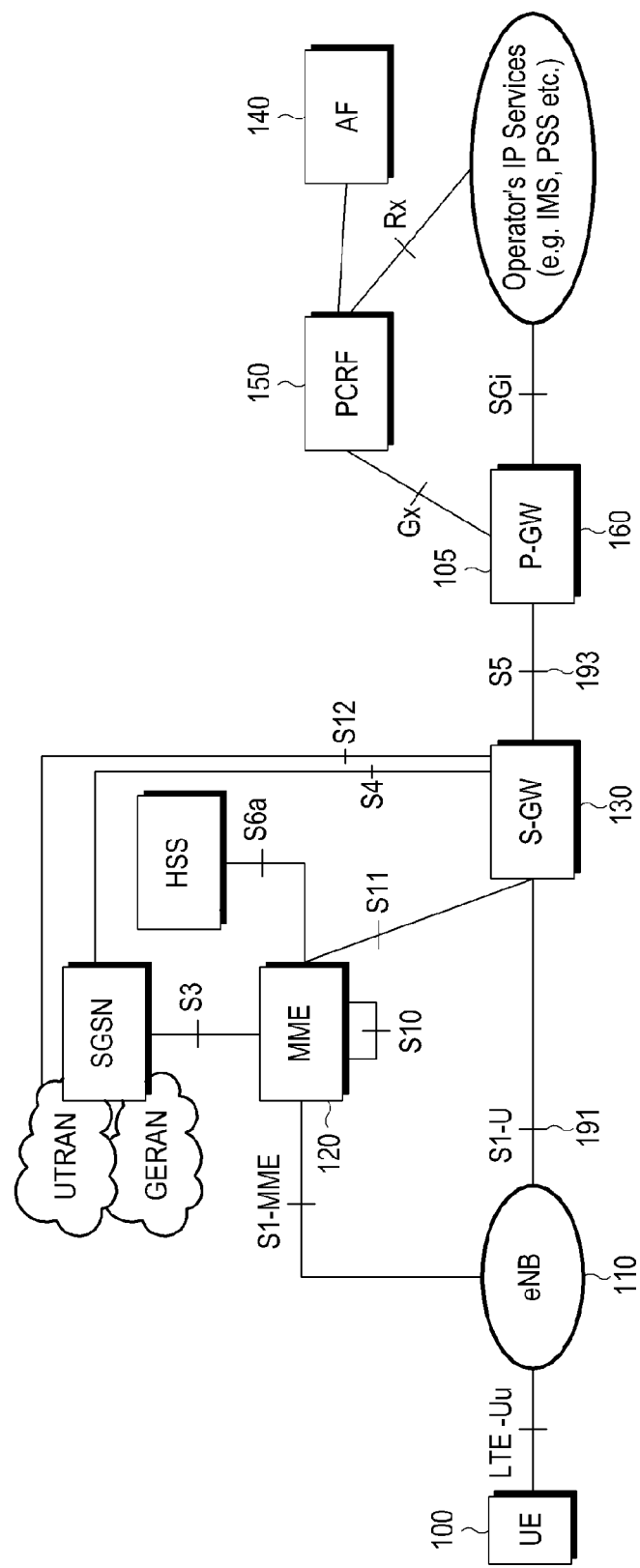
FIG. 1 illustrates an example of a structure of a communication system to which embodiments of the present disclosure are applicable.

Hereinafter, operating principles of exemplary embodiments of the present disclosure will be described with reference to the accompanying drawings. Throughout the drawings, identical elements will be referred to as identical reference numerals, and in the following description of the present disclosure, a detailed description of related well-known functions or structures will not be provided if it unnecessarily obscure the subject matter of the present disclosure. For the same reason, some elements are exaggerated, omitted, or schematically illustrated in the drawings. As such, actual sizes of respective elements are not necessarily represented in the drawings.

The following terminologies are defined in consideration of the functions in the present disclosure and may be construed in different ways by the intention or customs of the users and operators. Therefore, the definitions thereof should be construed based on the contents throughout the specification.

Advantages and characteristics of the present disclosure, and methods for achieving them will be apparent with reference to embodiments described below in detail in addition to the accompanying drawings. However, the present disclosure is not limited to the exemplary embodiments to be described below but may be implemented in various forms. Therefore, the exemplary embodiments are provided to enable the present disclosure to be completely disclosed and the scope of the present disclosure to be easily understood by those skilled in the art, in which is defined by the scope of the appended claims. It may be understood that each block of processing flow diagrams and combinations of the flow diagrams are executable by computer program instructions. The computer program instructions may be provided on processors of general-purpose computers, special-purpose computers, or other programmable data processing equipment, such that the instructions executed by the processors of the computers or other programmable data processing equipment generate means for performing functions described in the flow diagram block(s). The computer program instructions may also be stored in a computer-available or computer-readable memory which can be intended for a computer or other programmable data processing equipment in order to implement the functions in a specific way. The instructions stored in the computer-available or computer-readable memory may also be used to produce production articles which include instruction means for performing the functions described in the block(s) of the flow diagram. The computer program instructions may also be mounted on a computer or other programmable data processing equipment. Thus, the instructions which operate the computer or the other programmable data processing equipment by generating a process executed by a computer through a series of operation steps that are performed on the computer or other programmable data processing equipment may also provide steps for executing the functions described in the block(s) of the flow diagram.

Furthermore, each block may represent a part of a module, segment or code, which includes one or more executable instructions for executing specific logical functions. In addition, it is to be noted that in several alternative embodiments, the functions described in the blocks can be generated in different orders. For example, two blocks that are sequentially shown may be performed substantially at the same time or may be performed in reverse order according to a corresponding function.

The term '~unit' used in the present disclosure means software and/or a hardware element such as a Field-Programmable Gate Array (FPGA) or an Application-Specific Integrated Circuit (ASIC), and '~unit' performs some roles. However, '~unit' is not limited to software or hardware. The '~unit' may be configured to be stored in an addressable storage medium and to play at least one processor. Accordingly, for example, the '~unit' includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and '~unit' may be engaged by the smaller number of structural elements and '~unit', or may be divided by additional structural elements and '~unit'. Furthermore, structural elements and '~unit' may be implemented to play a device or at least one central processing unit (CPU) in a security multimedia card.

To meet user's demands such as high-speed data service transmission, for wireless communication systems, the 3$^{rd}$ Generation Partnership Project (3GPP) has standardized various Radio Access Network (RAN)-based technologies such as Universal Mobile Telecommunication System (UMTS) Terrestrial Radio Access Network (UTRAN), Evolved UTRAN (E-UTRAN), General Packet Radio Service (GPRS)/EDGE Radio Access Network (GERAN), and the like. 3GPP standard-based communication systems support various types of services and terminals. For example, the 3GPP standard-based communication systems are capable of supporting communication for not only communication terminals driven by users, like smart phones, but also Internet of Things (IoT) terminals to which a little or no intervention of users is applied. In addition, a communication service capable of performing device management, delivering particular information to terminals, or collecting particular information from terminals as well as voice/multimedia services may be supported.

Various new services may be provided according to agreement between a common carrier and a service provider, for example, $3^{rd}$ parties. For example, a sponsoring service may be provided by paying traffic transmission/reception costs for a particular $3^{rd}$ party service to be used by a terminal or a User Equipment (UE) designated by a user of a UE (hereinafter, referred to as a 'sponsored UE') or a UE group (hereinafter, referred to as a 'sponsored group') or giving the right to use a predetermined amount of traffic corresponding to the particular $3^{rd}$ party service as a present. Thus, a UE providing a sponsoring service may provide sponsored data or sponsored-charging-based right to a sponsored UE or a sponsored group through the sponsoring service. More specifically, the sponsoring service may be used for parents to allow use of a particular data service, for example, a learning data service and an educational video watching service, to their children. $3^{rd}$ party common carriers may provide various effects such as increasing subscribers to their sponsoring services by providing the sponsoring services in which subscribers to the sponsoring services provide sponsored data to other non-subscribers. In embodiments of the present disclosure, for convenience, a data service is assumed to be a sponsoring service, but the sponsoring service may include a service mode in which a user charges designated another user or gives right to the designated another user as a present.

Hereinafter, embodiments of the present disclosure will be described based on a 3GPP Long Term Evolution (LTE) system, but the embodiments of the present disclosure are applicable to other communication/computer systems having similar technical backgrounds and system forms without significantly departing from the scope of the present disclosure, as will be determined by those of ordinary skill in the art.

For example, the present disclosure for an LTE system may also be applied to a UTRAN/GERAN system having a similar system structure. In this case, an evolved NodeB (ENB) (a Radio Access Network (RAN) node) may be replaced with a Radio Network Controller (RNC)/Base Station Controller (BSC), and a Serving-Gateway (S-GW) may be omitted or may be included in a Serving GPRS Support Node (SGSN), and a Packet Data Network (PDN) Gateway (P-GW) may correspond to a Gateway GPRS Support Node (GGSN). The concept of a bearer in the LTE system may correspond to a packet data protocol (PDP) content of the UTRAN/GERAN system.

FIG. 1 illustrates an example of a structure of a communication system to which embodiments of the present disclosure are applicable. For convenience, a description will be made using an example in which the communication system of FIG. 1 is an LTE-based mobile communication system, but the present disclosure may also be applied to other types of systems without being significantly changed.

Referring to FIG. 1, for example, a Radio Access Network (RAN) in an LTE-based mobile communication system may include a next-generation base station (which will hereinafter be referred to as an 'ENB' or 'NodeB') 110, a Mobility Management Entity (MME) 120, and an S-GateWay (S-GW) 130.

A User Equipment (UE) 100 accesses an external network through the ENB 110, the S-GW 130, and a P-GW 160. For data transmission and reception of the UE 100 through the P-GW 160, PDN connection needs to be established and single PDN connection may include one or more Evolved Packet System (EPS) bearers.

An Application Function (AF) 140 exchanges application-related information with a user at an application level. In the description of an embodiment of the present disclosure, a sponsoring server of a common carrier capable of providing a sponsoring service may be regarded as a sort of AF. In an embodiment in which a Web Real Time Communication (WebRTC) is applied, an enhanced Proxy-Call Session Control Function (eP-CSCF) may be regarded as a sort of AF.

A Policy Charging and Rules Function (PCRF) 150 comprehensively controls a policy and billing related to a Quality of Service (QoS) regarding user's traffic, and Policy and Charging Control (PCC) rules corresponding to the policy may be delivered to the P-GW 160 for application.

The ENB 110 is an RAN node and corresponds to a Radio Network Controller (RNC) and a Base Station Controller (BSC) of a Global System for Mobile Communications (GSM)/Enhanced Data rates for GSM Evolution (EDGE) Radio Access Network (GERAN) system. The ENB 110 is connected with the UE 100 through a radio channel, and functions similarly with an existing RNC/BSC.

In the LTE, user's traffic including a real-time service such as a Voice over Internet Protocol (VoIP) is served through a shared channel. Thus, the ENB 110 collects and schedules condition information of the UE 100.

The S-GW 130 provides a data bearer, and generates or removes the data bearer under control of the MME 120.

The MME 120 manages various control functions, and one MME 120 may be connected with multiple eNBs.

Figure 2:
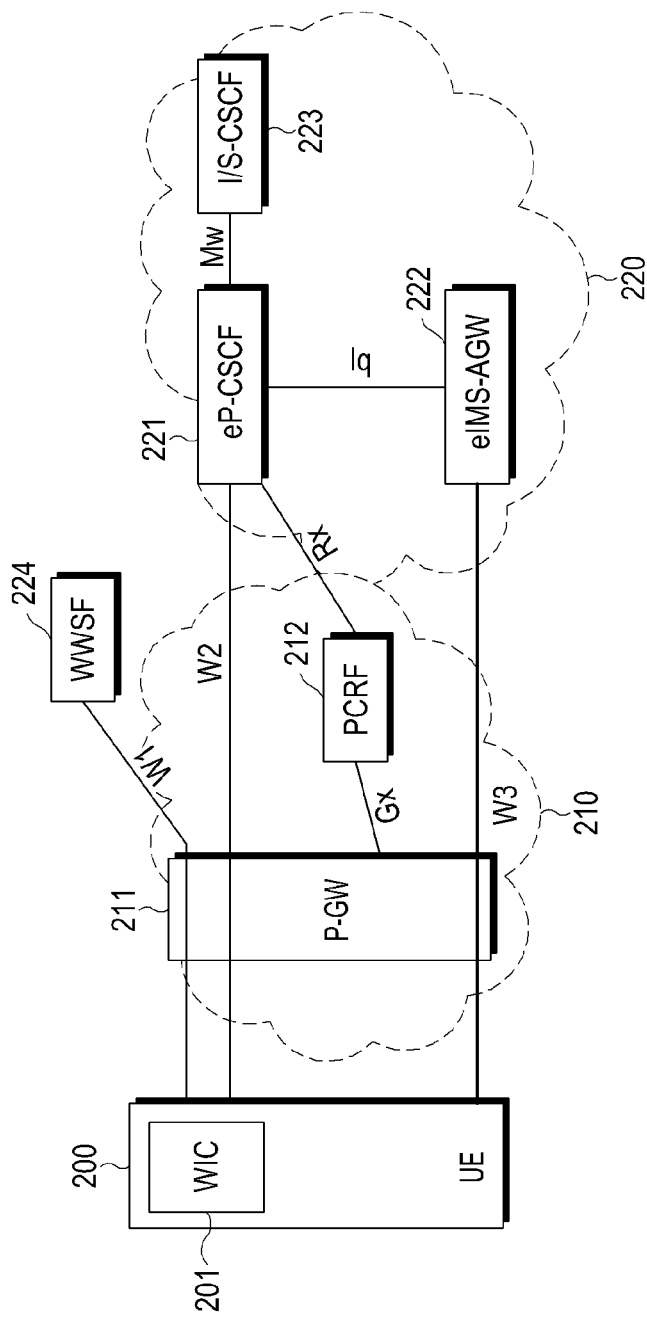
FIG. 2 illustrates an example of a network structure for providing a sponsoring service according to an embodiment of the present disclosure.

FIG. 2 illustrates an example of a network structure for providing a sponsoring service according to an embodiment of the present disclosure.

Referring to FIG. 2, a WebRTC IO Multimedia Subsystem (IMS) Client (WIC) 201 is client software in the UE 200 for receiving a particular communication service, for example, a WebRTC service of the 3GPP.

A WebRTC Web Server Function (WWSF) 224 is a web server introduced in order for a service provider to provide a service, for example, a WebRTC service. The WWSF 224 may include a communication unit for communicating with another network node and a controller for controlling an overall operation of the WWSF 224, for example, for controlling the WWSF 224 to operate as a web server for providing a corresponding service.

An eP-CSCF 221 is an enhanced P-CSCF for supporting an interworking service with a $3^{rd}$ party service provider. According to an embodiment of the present disclosure, the eP-CSCF 221 may be an enhanced facility for providing the WebRTC service. In a general aspect, entities for performing an additional operation to provide a service, including the eP-CSCF 221, will be referred to as Service Enabling Servers (SESs).

The eP-CSCF 221 corresponding to the SES may include a communication unit for communicating with another network node and a controller for controlling an overall operation of the SES. A PCRF 212 is an entity for comprehensively controlling a QoS and charging for traffic, and may comprehensively control a QoS or charging for a service provided by a service provider according to an embodiment of the present disclosure. The PCRF 212 may include a communication unit for communicating with another network node and a controller for controlling an overall operation of a PCRF.

The P-GW 211 applies and executes a policy the PCRF 212 is to apply, that is, the PCC rules. The P-GW 211 may also include a communication unit for communicating with another network node and a controller for controlling an overall operation of the P-GW 211.

Hereinafter, in an embodiment of the present disclosure, for convenience, a network structure for providing a 3GPP WebRTC service will be assumed for the description. However, an embodiment of the present disclosure is not limited to the WebRTC service, and may also be applied to other types of Web services without being significantly changed. Depending on an embodiment, a WIC 201 in the UE 200 may operate as client software for a general Web service, the WWSF 224 may operate as a general Web server, and the eP-CSCF 221 may operate as a network device for supporting interworking between a common carrier and a 3$^{rd}$ party service provider. In the following description of embodiments of the present disclosure, the UE 200 may refer to the WIC 201 in the UE.

Figure 3A:
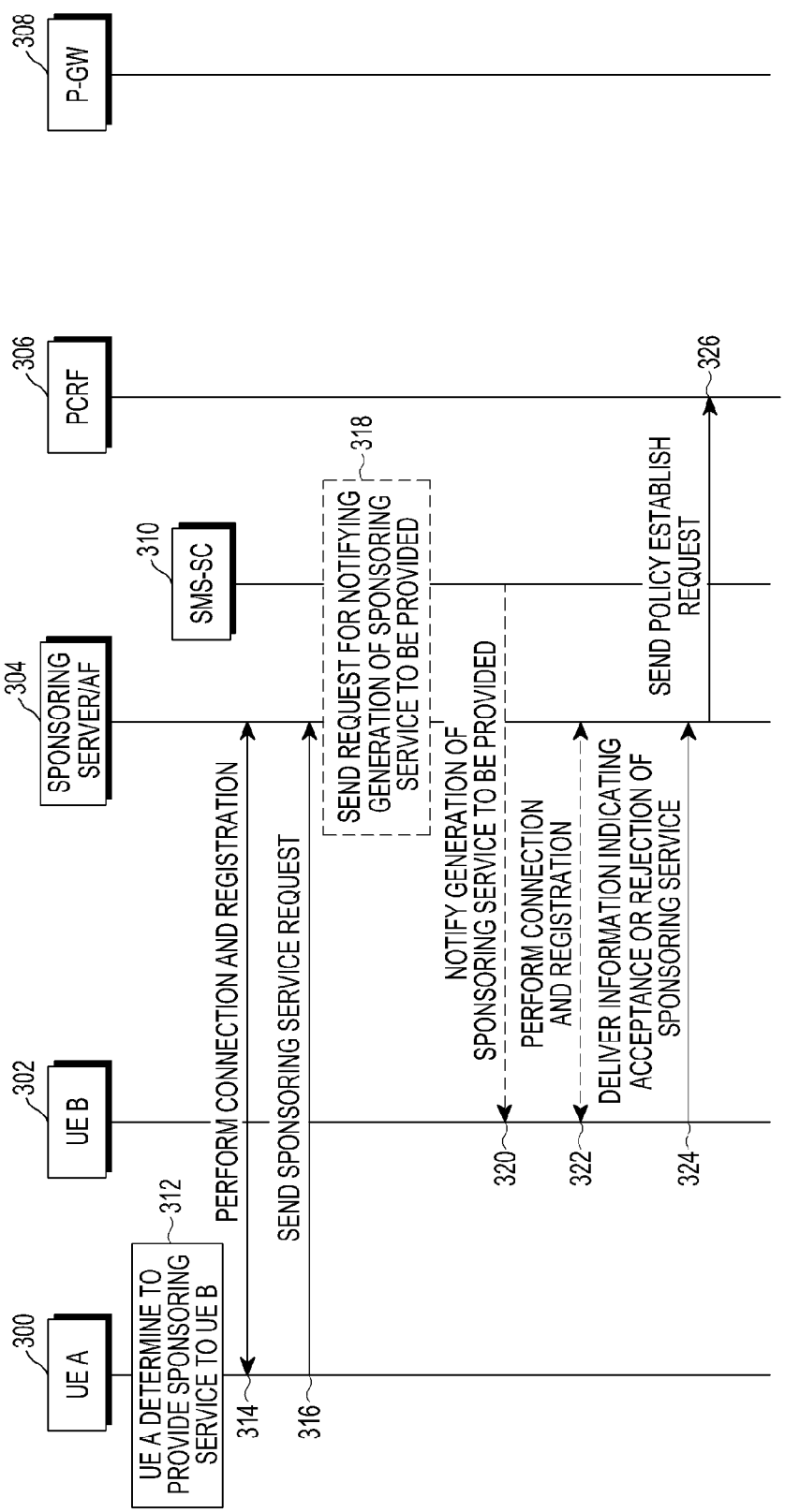
FIGS. 3A and 3B illustrate an operating flow for providing a sponsoring service to a UE of another user designated by an arbitrary UE according to an embodiment of the present disclosure.
Figure 3B:
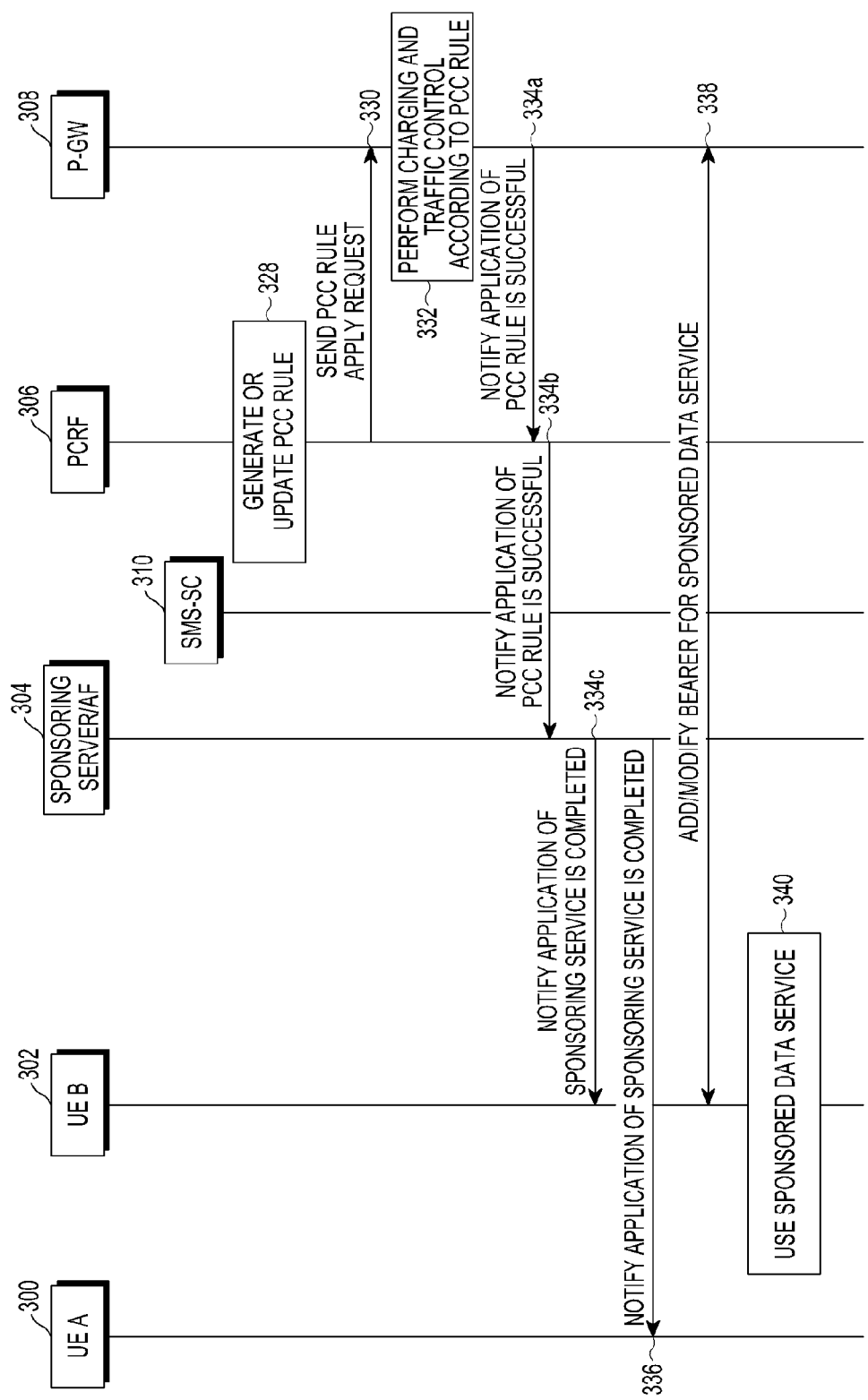

FIGS. 3A and 3B illustrate an operating flow for providing a sponsoring service to a UE of another user designated by an arbitrary UE according to an embodiment of the present disclosure.

Referring to FIGS. 3A and 3B, it is assumed that a user's UE desiring to provide a sponsoring service, for example, a UE A 300, determines to provide a particular service, for example, a sponsoring service for a data service, to a UE of another user, that is, a UE B 302, in operation 312. In the following embodiments, for convenience, suppose that 'UE A' refers to a UE of a user providing a sponsoring service and 'UE B' refers to a sponsored UE for being provided with the sponsoring service. In operation 314, the UE A 300 connects to and is registered in, for example, a sponsoring server/AF 304 provided by a common carrier to provide the sponsoring service. For connection and registration, the UE A 300 may register an identifier (ID) and a password of a user in the sponsoring server/AF 304. In operation 316, the UE A 300 having completed registration with the sponsoring server/AF 304 sends a sponsoring service request for the UE B 302 to the sponsoring server/AF 304. Herein, the sponsoring service request includes information for providing the sponsoring service (hereinafter, referred to as 'sponsoring service-related information'). The sponsoring service-related information may include, for example, an ID of the UE B 302, a sponsor ID for identifying a sponsor for providing the sponsoring service to the UE B 302, an Application Service Provider (ASP) ID for identifying an entity for providing an application service to be provided through the sponsoring service, an ID of a target common carrier such as a Public Land Mobile Network (PLMN) ID, sponsoring service characteristic information, and the like. Herein, the sponsor ID may be an ID of the UE A 300 that is a sponsor UE for providing the sponsoring service. If there is a medium for delivering the sponsoring service provided by the UE A 300 to the UE B 300, the sponsor ID may be an ID of the medium. The ID of the UE B 302 may include, for example, a web access ID with which the UE B 302 is registered, an e-mail address, phone number information allocated to the UE B 302, for example, a Mobile Station International Integrated Services Digital Network Number (MSISDN), and the like. The sponsoring service characteristic information may include sponsored information for a corresponding application provided through a sponsoring service to be provided to the UE B 302, for example, a maximum amount of use of the sponsored data service, an allowed time for use of the sponsored data service, a service type of the sponsored data service, and the like.

In operation 318, the sponsoring server/AF 304 starts a procedure for notifying generation of a sponsoring service to be provided to the UE B 302. For example, the sponsoring server/AF 304 delivers a request for the notification to a Short Messaging Service-Service Center (SMS-SC) 310. The request for the notification may include the sponsoring service-related information obtained from the received sponsoring service request. Depending on an embodiment, the request for the notification may include MSISDN information of the UE B 302 included in the sponsoring service request. According to another embodiment, if the sponsoring service request includes ID information of the UE B 302 instead of the MSISDN information of the UE B 302, the MSISDN information of the UE B 302 previously stored in the sponsoring server/AF 320 may be acquired using the ID information of the UE B 302 and may be included in the request for the notification.

Then, in operation 320, the SMC-SC 310 transmits the notification including the sponsoring service-related information acquired from the request for the notification to the UE B 302 in the form of a Short Messaging Service (SMS) or Multimedia Messaging Service (MMS) message. Thus, the SMC-SC 310 may notify generation of the sponsoring service to be provided to the UE B 302. Herein, information included in the SMS or MMS message may include MSISDN information of the UE B 302 acquired from the sponsoring server/AF 304 based on the above-described sponsoring service-related information or ID information of the UE B 302, ID information of the UE A 300, a sponsor ID, an ID of a target common carrier such as a PLMN ID, sponsoring service characteristic information, or the entire link address connected to the sponsoring service characteristic information or a part of the link address. A process of notifying the generation of the sponsoring service to the UE B 302 in operations 318 and 320 may include delivering, by the sponsoring server/AF 304, an internet protocol (IP) message or e-mail including the sponsoring service characteristic information or the entire link address connected to the sponsoring service characteristic information or a part of the link address to the UE B 302.

Meanwhile, to check the sponsoring service-related information or to indicate acceptance or rejection of the generated sponsoring service, the UE B 302 notified of the generation of the sponsoring service from the UE A 300 performs connection and registration with the sponsoring server/AF 304 in operation 322. According to another embodiment of the present disclosure, to facilitate connection and registration with the sponsoring server/AF 304 by the UE B 302, a temporary Uniform Resource Identifier (URI) generated at random may be included in the request for the notification in operation 318 and the notification in operation 320. In this case, the UE B 302 may perform connection and registration with the sponsoring server/AF 304 relatively simply through a simple authentication process using the temporary URI acquired from the notification. Operations 320 and 322 may be selectively performed. That is, if the UE B 302 has already been registered in the sponsoring server/AF 304, a separate registration process does not need to be performed.

Thereafter, in operation 324, the UE B 302 delivers information indicating acceptance or rejection of the sponsoring service recognized through the notification to the sponsoring server/AF 304. The information indicating acceptance or rejection may be transmitted using, for example, a Hyper Text Transfer Protocol (HTTP). For convenience, it is assumed that the UE B 302 delivers information indicating acceptance of the generated sponsoring service. Then, in operation 326, the sponsoring server/AF 304 sends a policy establish request for starting providing the sponsoring service to a PCRF 306. Herein, the policy establish request may use a diameter protocol. Thus, based on the diameter protocol, the policy establish request may use one of commands such as 'AA request', 'Accounting request', 'Credit-Control request', 'Re-Auth request', and so forth. The policy establish request may include an ID of the UE A 300 providing the sponsoring service, a sponsor ID, and an ASP ID. The policy establish request may also include a PLMN ID of a target common carrier. The policy establish request may also include ID information of the UE B 302, for example, International Mobile Subscriber Identity (IMSI) information. The policy establish request may include a service descriptor from which a service data flow for an actual service may be recognized. Herein, the service descriptor may include at least one of an IP address, a port, a domain name, an application ID, and an URI for which the sponsoring service is to be provided. The policy establish request may also include the above-described sponsoring service characteristic information. Hereinafter, the service descriptor and a service flow descriptor used herein will have the same meaning.

In operation 328, the PCRF 306 newly generates a PCC rule by using the information acquired from the policy establish request received from the sponsoring server/AF 304 or updates an already generated and used PCC rule. Herein, the newly generated or updated PCC rule includes sponsored data-related information. In operation 330, the PCRF 330 delivers a request for applying the PCC rule, including the newly generated or updated PCC rule, to a P-GW 308. Herein, the generated or updated PCC rule may also use a diameter protocol. The PCC rule generated or updated based on the diameter protocol may use one of commands such as 'AA request', 'Accounting request', 'Credit-Control request', 'Re-Auth request', and so forth. The generated or updated PCC rule may include a charging key for separate charging for sponsored data. According to an embodiment, the charging key may be allocated to be shared between a particular sponsor and an Application Service Provider (ASP), instead of being allocated for each user. The generated or updated PCC rule may include a service descriptor for identifying a Service Data Flow (SDF) to which sponsored charging is applied. Assuming a case where providing of a data service other than the sponsored data service to a UE is not allowed, the service descriptor may be configured to close a gate for other SDFs than an SDF to which sponsored charging is applied.

In operation 332, the P-GW 308 performs or starts charging and traffic control corresponding to the PCC rule received from the PCRF 306. The P-GW 308 according to an embodiment of the present disclosure does not perform general charging with respect to sponsored data, and instead, performs charging by using the charging key acquired from the PCC rule. Suppose that the use of particular data is not allowed for the UE B 302, for example, use of any data service other than the sponsored data service is not allowed. In this case, the P-GW 308 may perform traffic control according to a gate status that is set in the service descriptor of the PCC rule. In operations 334a and 334b, the P-GW 308 delivers a response notifying that application of the PCC rule requested in operation 330 is successful to the sponsoring server/AF 304 through the PCRF 306. The response in operations 334a and 334b may also use the diameter protocol, based on which one of the commands, 'AA response', 'Accounting response', 'Credit-Control response', 'Re-Auth response', and the like may be used. Then, in operations 334c through 336, the sponsoring server/AF 304 notifies each of the UE A 300 and the UE B 302 of completion of application of the sponsoring service. The notification regarding completion of application of the sponsoring service may be encoded using an HTTP or a Session Initiation Protocol (SIP). In particular, if the SIP protocol is used, the notification may be transmitted in the form of a 200 OK message. The notification regarding completion of application of the sponsoring service may include information indicating that the sponsored data service is applied and information allowed by the PCRF 306 with respect to the sponsoring service characteristic information of operation 316. For example, if the PCRF 306 allows all of the sponsoring service characteristic information requested by the UE A 300, the notification regarding completion of application of the sponsoring service may include the same information as the sponsoring service characteristic information or information indicating that all of the sponsoring service characteristic information is allowed. If some of the sponsoring service characteristic information is allowed, the notification regarding completion of application of the sponsoring service may include only allowed information. If not only a service corresponding to the sponsoring service characteristic information, but also a more service than requested through promotion or the like is allowed, the notification regarding completion of application of the sponsoring service may include not only the requested sponsoring service characteristic information, but also added service information. For example, the notification may include a maximum allowed amount of data, an allowed time, and so forth If generation or modification of an EPS bearer is needed to provide the sponsored data service to the UE B 302, the P-GW 308 triggers the UE B 302 to generate or modify the EPS bearer in operation 338. In the triggering process, packet filters for the sponsored data service generated by the P-GW 308 may be installed in the UE B 302. It is assumed that use of a particular data service is allowed in the sponsoring service, for example, any data service other than the sponsored data service is blocked. In this case, to allow packet transmission and reception only for a particular IP flow corresponding to the sponsored data service, set packet filters are installed in the UE B 302. Then, in operation 340, the UE B 302 uses the sponsored data service in a manner corresponding to detailed information of the sponsored data service to be provided, which is included in the notification regarding completion of application of the sponsoring service received from the sponsoring server/AF 304. Upon receiving additional information regarding the sponsored data service, the UE B 302 displays the information on a screen to inform a user of the received additional information.

In a modification of the embodiment of FIGS. 3A and 3B, an embodiment may be considered in which the UE A 300 provides the sponsoring service to the UE B 302 by using a part of an available amount of a data service of the UE A 300. In this embodiment, through the same processes as FIGS. 3A and 3B, the sponsored data service is provided to the UE B 302. In addition, the UE A 300 subtracts the amount of the sponsored data service to be provided to the UE B 302 from the available amount and sets the remaining available amount of the data service as a current available amount of the data service for the UE A 300, thus modifying the PCC rule. As discussed above, if the UE B 302 accepts the sponsoring service provided by the UE A 300 in operation 324, operations 326 through 334*b* are performed in the same manner, such that based on the remaining available amount of the data service according to the modified PCC rule, the UE A 300 may use the data service.

In another modification of the embodiment of FIGS. 3A and 3B, an embodiment that does not use the charging key may be considered. In this case, in operation 330, the PCRF 306 may include some or all of the sponsor ID, the ASP ID, the MSISDN of the UE A 300, and the IMSI of the UE A 300, instead of the charging key, in the PCC rule. The PCC rule may be included in a PCC rule apply request for delivery to the P-GW 308. Thus, in operation 332, in a process of starting charging and traffic control based on the received PCC rule, for the sponsored data service, the P-GW 308 charges a sponsor and a particular service provider by using the received sponsor ID and ASP ID, instead of performing general charging. The P-GW 308 may also use ID information of the UE A 300 providing the sponsoring service, for example, the MSISDN or the IMS, in addition to the sponsor ID and the ASP ID. Suppose that when the sponsoring service is provided, the use of the particular data service is not allowed, for example, any data service other than the sponsored data service is blocked. In this case, the P-GW 308 acquires a gate state of a blocked gate for an SDF other than an SDF for the sponsored data service from the received PCC rule, and performs traffic control corresponding to the gate state.

In further another modification of the embodiment of FIGS. 3A and 3B, an embodiment may be considered in which a target to which the UE A 300 of FIGS. 3A and 3B provides the sponsoring service is a sponsored group instead of one sponsored UE. For example, the sponsored group may be grouped with user's wearable devices. In this case, the sponsoring service request in operation 316 may include all of identification information of UEs of the sponsored group to which the sponsoring service is to be provided. That is, the sponsoring service request may include an ID of each of the UEs, which are sponsoring service targets, an ID of a sponsored group to which the UEs belong, a sponsor ID, an ASP ID, a PLMN ID of a target common carrier, and sponsoring service characteristic information. Herein, an ID of a UE may include, for example, a web access ID of the UE or MSISDN allocated to the UE, that is, phone number information. The ID of the sponsored group is an ID of a group in which target UEs to which the sponsoring service is to be provided are registered, and the sponsoring server/AF 304 may previously store a web access ID of each UE of a sponsored group or phone number information such as MSISDN for each ID of the group and may acquire the ID of the sponsored group based on the stored information. The sponsoring service characteristic information may include, for example, a maximum use amount, an allowed time, and a service type of the sponsoring service provided to the sponsored group.

If the UE A 300 provides sponsoring with respect to the sponsored group, operations 318 through 324 are performed to each of the target UEs of the sponsored group in the same manner to notify generation of the sponsoring service to be provided, and acceptance or rejection of the sponsoring service is notified from each of the target UEs. In a process of applying a newly generated or modified PCC rule through the PCRF 306 in operations 326 through 330, the sponsoring server/AF 304 considers an ID of the sponsored group to which the sponsoring service is provided and IDs of the target UEs included in the sponsored group. That is, instead of ID information of the UE B 302 of FIGS. 3A and 3B, the ID of the sponsored group may be included, and for the sponsoring data characteristic information, the amount of consumption of the sponsored data service to be provided to the target UEs of a group, a use time of the sponsored data service, and the like may be collected and managed for each sponsored group.

In the embodiment and modified embodiments of FIGS. 3A and 3B, the sponsoring server/AF 304 of a common carrier network or the PCRF 306 may identify an IP flow or the SDF for which the sponsored data service is targeted. If an address or port providing the sponsored data service is uniform, the IP flow or the SDF for which the sponsored data service is targeted may be previously set and used for the sponsoring server 304 of the common carrier network or the PCRF 306. However, if an address or port of the server providing the sponsored data service dynamically changes, it is difficult to use information that is previously set for the IP flow or the SDF for which the sponsored data service is targeted. If the address or port of the server dynamically changes, it corresponds to a case where a Contents Delivery Network (CDN), cash, Network Address Translation (NAT), or the like is used. Therefore, in an embodiment of the present disclosure, a server of a service provider delivers a list of address information such as an address and a port to be used for the sponsoring service to be provided later to the sponsoring server/AF 304 of the common carrier network. In this case, when the sponsored data service is provided through a server in which an address of a web service and contents included therein dynamically changes, the IP flow or the SDF for which the supported data service is targeted may be accurately identified. In the current embodiment, address information of the sponsoring service provided by the server of the service provider is information indicating a place where particular traffic exists, and may be used as a meaning including an URI as well as an IP address, a port, and a domain name.

Figure 4A:
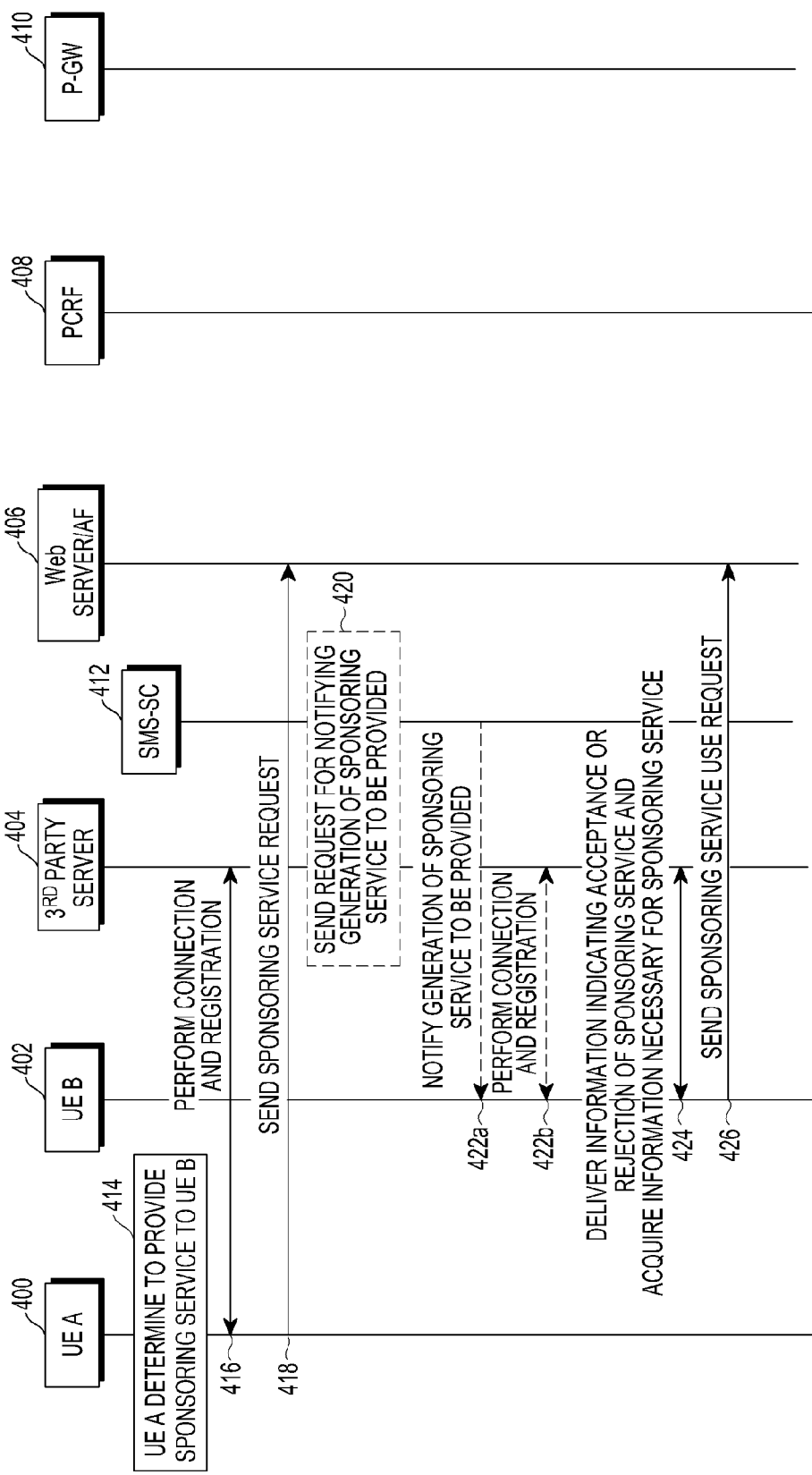
FIGS. 4A and 4B illustrate an operating flow for providing a sponsoring service to a UE of another user designated by an arbitrary UE according to another embodiment of the present disclosure.
Figure 4B:
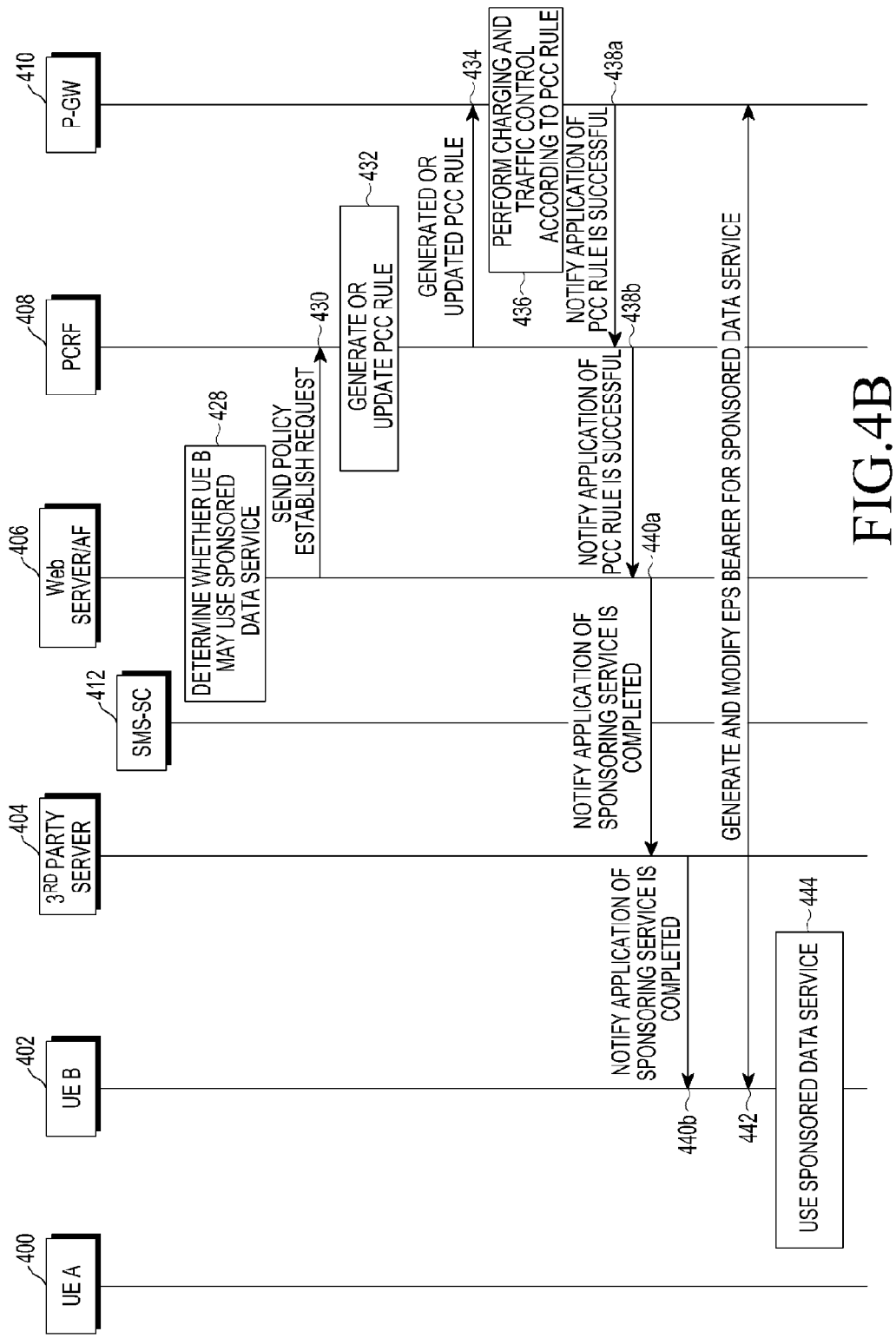

FIGS. 4A and 4B illustrate an operating flow for providing a sponsoring service to a UE of another user designated by an arbitrary UE according to another embodiment of the present disclosure.

Referring to FIGS. 4A and 4B, in operation 414, a UE A 400 is assumed to determine to provide a particular service, for example, a sponsoring service for a data service to a UE B 402. In operation 416, the UE A 400 connects to and is registered in a web server of a $3^{rd}$ party application operator (which will hereinafter be referred to as a $3^{rd}$ party server) 404 to provide the sponsoring service. Herein, for connection and registration, the UE A 400 registers a user ID and a password in the $3^{rd}$ party server 404. In operation 418, the UE A 400 having completed registration in the $3^{rd}$ party server 404 sends a sponsoring service request for the UE B 402 to a web server/AF 406. Herein, the sponsoring service request includes sponsoring service-related information which may be configured identically to the sponsoring service-related information of FIGS. 3A and 3B, and thus will not be repetitively described.

In operations 420 through 422*a*, the $3^{rd}$ party server 404 notifies the UE B 402 of generation of the sponsoring service to be provided to the UE B 402 through the SMC-SC 412. Operations 420 through 422*a* are the same as operations 318 and 320 of FIGS. 3A and 3B and thus will not be repetitively described.

The UE B 402 having been notified of generation of the sponsoring service from the UE A 400, in operation 422*a* may connect to and be registered in the $3^{rd}$ party server 404 in operation 422*b* to check the sponsoring service-related information or to notify acceptance or rejection of the generated sponsoring service. In operations 420 through 422*b*, like in operations 318 and 320 of FIGS. 3A and 3B, connection to and registration in the $3^{rd}$ party server 404 may be performed relatively simply through simple authentication using a temporary URI. Operations 422*a* and 422*b* may also be performed selectively. That is, if the UE B 402 has already been registered in the $3^{rd}$ party server 404, separate registration does not need to be performed.

In operation 424, the UE B 402 notifies the $3^{rd}$ party server 404 of acceptance or rejection of the sponsoring service recognized through the notification, and if acceptance of the sponsoring service is notified, the UE B 402 receives information for the sponsoring service from the $3^{rd}$ party server 404. The information for the sponsoring service may be configured similarly with the sponsoring service-related information of FIGS. 3A and 3B. More specifically, the information for the sponsoring service may include an ID of the UE A 400, a sponsor ID of a sponsor providing the sponsored data service, an ASP ID, and a PLMN ID of a target common carrier. The information may be delivered in the form of a message using a 'HTTP GET', 'POST', or 'PUT' method. The message may be included in the form of an access token indicating that connection to a common carrier network by the UE B 402 and use of the sponsored data service by the UE B 402 are allowed. Herein, for convenience, the access token is used separately from other information related to the sponsoring service. However, depending on an embodiment, information related to the sponsoring service may be entirely included in the access token. The access token according to an embodiment of the present disclosure is configured according to a format agreed in advance between a service provider and a common carrier, and may be information issued by the common carrier and delivered in advance to the service provider. According to an embodiment of the present disclosure, a part of the access token may include information indicating that the use of the sponsored data service by the UE B 402 is allowed and may further include information indicating characteristics of the sponsored data service, for example, a maximum amount of use of the sponsored data service, an allowed time for use of the sponsored data service, a service type of the sponsored data service, and the like. The access token according to an embodiment of the present disclosure is information used to determine existence of a right for a particular service or resource, and may be encoded according to a rule agreed between the $3^{rd}$ party server 404 and a common carrier network (a Service Enabling Server (SES) according to an embodiment of the present disclosure). The access token may be used in a form maintaining security according to an agreed rule so as to prevent wrong use or modulation. To this end, in an embodiment of the present disclosure, the following methods may be used.

First, in an embodiment of the present disclosure, the common carrier provides a group of access tokens that may be issued to users to the $3^{rd}$ party server 404 which then uses one of the access tokens included in the group.

The common carrier and the $3^{rd}$ party server 404 according to another embodiment of the present disclosure generate authentication information that they mutually trust, for example, access tokens having the same rule by using a preset shared key, and check the access tokens. More specifically, the $3^{rd}$ party server 404 generates an access token by using at least one of an ID of the UE A 400, the sponsor ID, the ASP ID, current time, the PLMN ID, other service-related information, and the shared key, and delivers the generated access token to the common carrier. The common carrier, that is, a Service Enabling Server (SES), then determines whether the received access token is valid by using the foregoing information and the shared key. In this case, in operation 426, the UE B 402 sends a request for using the sponsoring service to the web server/AF 406, which is a SES, or the eP-CSCF of FIG. 2 through a common carrier network. Herein, a message corresponding to the sponsoring service use request may be encoded using the HTTP or the SIP. When the SIP is used, the message may be delivered using 'Register method' or 'Invite method'. The sponsoring service use request includes the access token acquired in operation 424. The sponsoring service use request may further include the sponsor ID for the sponsored data service, the ASP ID, and the PLMN ID of the target common carrier. The request may also include additional information of the sponsored data service to be provided to the UE B 402 through the SES or Web server/AF 406, that is, an ID of the $3^{rd}$ party server, a list of addresses to be used by the $3^{rd}$ party server, and the like. In operation 428, the SES or Web server/AF 406 determines, based on the information acquired from the request received from the UE B 402, whether the UE B 402 may use the sponsored data. In this operation, the SES or Web server/AF 406 may use the entire access token delivered from the UE B 402 or a part of the access token. The SES or Web server/AF 406 may perform information exchange with the UE B 402 for additional authentication and security.

If determining that the UE B 402 may use the sponsored data service, the SES 406 sends a policy establish request for starting the sponsored data service to a PCRF 408 in operation 430. Herein, the policy establish request is configured identically to the policy establish request of operation 326 of FIGS. 3A and 3B, and thus will not be repetitively described.

In operations 432 and 434, the PCRF 408 newly generates or updates a PCC rule corresponding to the policy establish request and delivers the PCC rule to a P-GW 410. In operation 436, the P-GW 410 starts charging and traffic control corresponding to the received PCC rule. Operations 432 through 436 are the same as operations 328 through 332 of FIGS. 3A and 3B, and thus will not be described again. In operations 438*a* and 438*b*, the P-GW 410 delivers a response for notifying that requested PCC rule application is successful to the PCRF 408 and the SES or Web server/AF 406. The response in operations 438*a* and 438*b* are configured identically to the response in operations 334*a* through 334*c* of FIGS. 3A and 3B, and thus will not be described again. In operations 440*a* and 440*b*, the SES or Web server/AF 406 notifies the UE B 402 of completion of application of the sponsoring service through the $3^{rd}$ party server 404. A message notifying completion of application of the sponsoring service is configured identically to that in operations 334*c* and 336 of FIGS. 3A and 3B, and thus will not be described again.

In operation 442, the P-GW 410 triggers the UE B 402 to generate or modify an EPS bearer based on the sponsored data service. In operation 444, the UE B 402 uses the sponsored data service provided corresponding to the PCC rule. Operations 442 and 444 are the same as operations 338 and 340 of FIGS. 3A and 3B, and thus will not be described again.

In a modification of the embodiment of FIGS. 4A and 4B, the UE A 400 may provide a sponsoring service to the UE B 402 by using a part of an available amount of the data service for the UE A 400. In this embodiment, through the same processes as in the embodiment of FIG. 4A and FIG. 4B, the sponsored data service is provided to the UE B 402. Moreover, the UE A 400 subtracts an amount of the sponsored data service to be provided to the UE B 402 from the available amount and sets the remaining available amount of the data service as a current available amount of the data service for the UE A 400, thus modifying the PCC rule. More specifically, to generate an access token including information regarding the remaining available amount of the data service for the UE A 400 and deliver the access token to the UE A 400, the $3^{rd}$ party server 404 may perform operations, which follow operation 420 performed with respect to the UE B 402, with respect to the UE A 400. Through this process, the UE A 400 may use the data service based on the remaining available amount of the data service.

In another modification of the embodiment of FIGS. 4A and 4B, a charging key may not be used. In this case, in operation 434, some or all of the sponsor ID, the ASP ID, the MSISDN of the UE A 400, and the IMSI of the UE A 400, instead of the charging key, may be included in the PCC rule apply request for delivery to the P-GW 410. Thus, in operation 436, the P-GW 410 may charge the sponsor and the particular service provider by using the received sponsor ID and the ASP ID, instead of performing general charging, for the sponsored data service in the process of starting charging and traffic control according to the received PCC rule. Operations 434 and 436 are the same as operations 330 and 332 of the modification of the embodiment of FIGS. 3A and 3B in which the charging key is not used, and thus will not be described again.

In further another modification of the embodiment of FIGS. 4A and 4B, an address of a web service may be delivered. In this case, like in operation 424 of FIGS. 4A and 4B, if the UE B 402 indicates acceptance of the sponsoring service to the $3^{rd}$ party server 404, the UE B 402 may be provided with information corresponding to the indication and information for the sponsoring service from the $3^{rd}$ party server 404. The information corresponding to the indication and the information for the sponsoring service may include the same information as and are configured in the same message format as the information described in operation 424 of FIGS. 4A and 4B. However, in the current embodiment, the message may further include information related to a service flow descriptor of an address of a server to be used in a sponsoring service to be provided after the UE B 402 accepts the sponsoring service (which will hereinafter be referred to as a 'subsequent service'). For example, it is assumed that the UE B 402 should connect to URI 1 to receive an image corresponding to the subsequent service and connect to URI 2 to receive video corresponding to the subsequent service. In this case, the service flow descriptor may be configured with URI 1 and URI 2. Then, the message in operation 424 includes the service flow descriptor included together with the information described in the embodiment of FIGS. 4A and 4B. The service flow descriptor may also be delivered as an information element separate from the access token. According to another embodiment, the service descriptor may be delivered through the access token. Herein, the access token is encoded according to an agreed rule and is used to maintain security as described in the embodiment of FIGS. 4A and 4B, and thus will not be described again.

In operation 426, the UE B 402 delivers the sponsoring service use request to the SES 406. The sponsoring service use request may include the access token acquired in operation 424, the sponsor ID for the sponsored data service, the ASP ID, and other additional information of the subsequent service, for example, the ID of the $3^{rd}$ party server, the list of the addresses to be used by the $3^{rd}$ party server, and the like. In the current embodiment, the sponsoring service use request may include a service flow descriptor used for the UE B 402 to receive the subsequent service. The service flow descriptor may be configured identically to the above-described service flow descriptor. The sponsoring service use request may further include the PLMN ID of the target common carrier. In the current embodiment, for convenience, the access token is used separately from other service-related information including an address, but any information related to the sponsoring service may be included and encoded in the access token.

In still another modification of the embodiment of FIGS. 4A and 4B, the UE A 400 may provide the sponsoring service to a sponsored group rather than a single sponsored UE. In this case, in operations 420 through 424 of FIGS. 4A and 4B, an access token is generated and delivered to each of UEs included in the sponsored group. When the SES 406 applies a PCC rule newly generated or modified by the PCRF 408 in operations 430 through 434, the same operations as operations 326 through 330 of FIGS. 3A and 3B are performed. Other operations are the same as those in the modification of the embodiment of FIGS. 3A and 3B in which the sponsoring service is provided to a group of UEs, and thus will not be described again.

Meanwhile, in yet another modification of the embodiment of FIGS. 4A and 4B, an embodiment may be considered to identify an IP flow or SDF in which the SES 406 or the PCRF 408 of the common carrier network may be a target of the sponsored data service. In this embodiment, operations other than delivery of information transmitted and received in the embodiment of FIGS. 4A and 4B through an access token are the same as those in the modification of the embodiment of FIGS. 3A and 3B for identifying the IP flow or the SDF, and thus will not be described again.

Figure 5A:
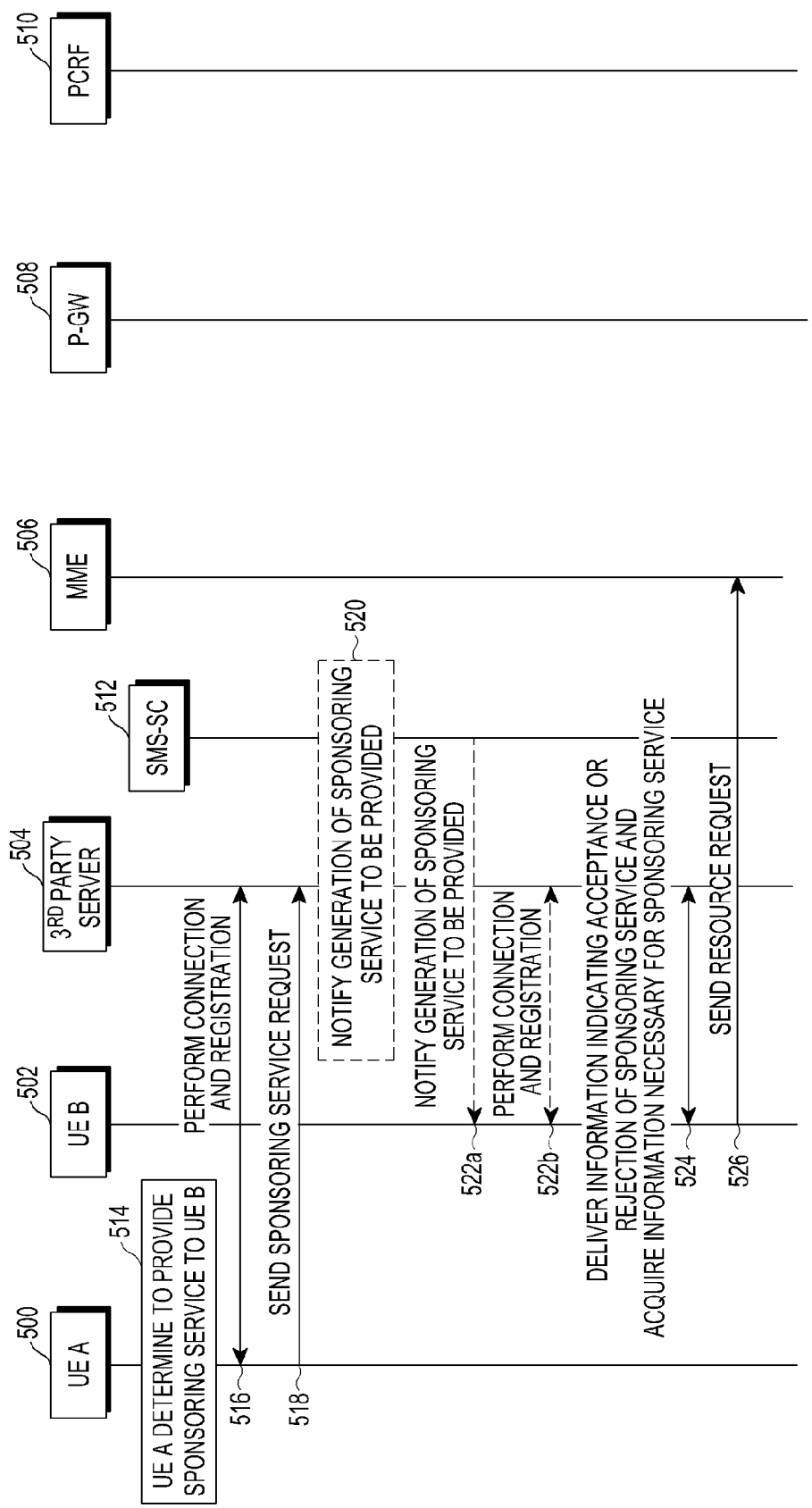
FIGS. 5A and 5B illustrate an operating flow for transmitting, by a sponsored UE, received sponsoring information to a core network node by using a Protocol Configuration Option (PCO) according to an embodiment of the present disclosure.
Figure 5B:
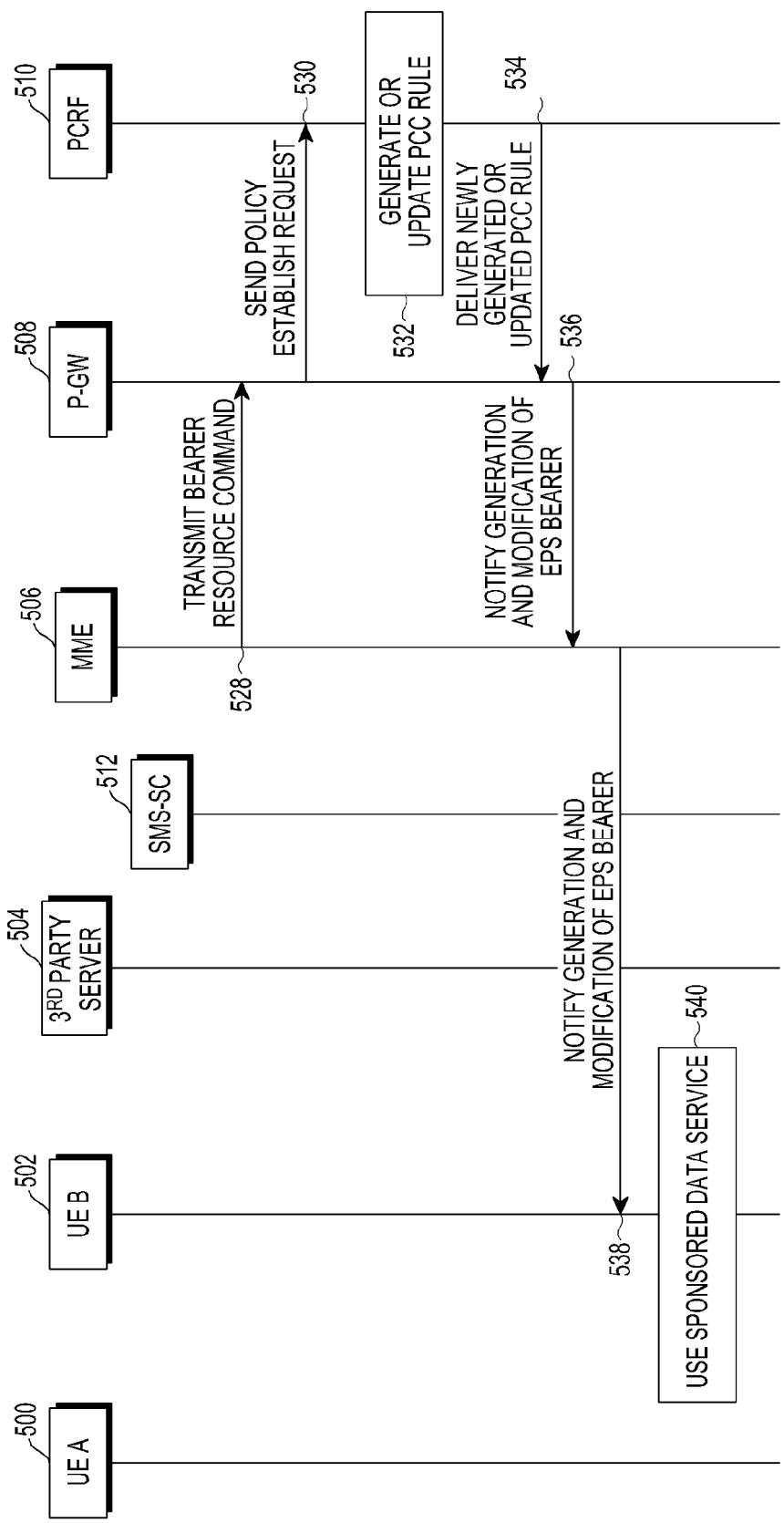

FIGS. 5A and 5B illustrate an operating flow for transmitting, by a sponsored UE, received sponsoring information to a core network node by using a Protocol Configuration Option (PCO) according to an embodiment of the present disclosure.

Referring to FIGS. 5A and 5B, a UE A 500 and a UE B 502 in operations 514 through 524 operate in the same manner as those in operations 414 through 424 of FIGS. 4A and 4B, and thus will not be described again.

In operation 526, the UE B 500 sends a resource request for receiving the sponsored data service to a core network node of a common carrier network, for example, an MME 506. Hereinafter, for convenience, the core network node is assumed to be an MME. Herein, the resource request may be sent in the form of a bearer resource allocate request or a bearer resource modify request including the sponsoring service-related information received from the $3^{rd}$ party server 504. According to an embodiment, the sponsoring service-related information may be transmitted through a PCO of a message corresponding to the resource request. That is, the UE B 502 may transmit an access token received from the $3^{rd}$ party server 504 through the PCO. If the access token and a Message Authentication Code (MAC) are separated from each other, the access token and the MAC are transmitted through the PCO. The UE B 502 may incorporate a Traffic Flow Aggregate (TFA) including IP information for the sponsored data service into a message corresponding to the resource request. Herein, the TFA is information generated from the service flow descriptor received from the $3^{rd}$ party server 504. Suppose that the UE B 502 has a packet filter (that is, a match all filter) capable of performing an operation of transmitting and receiving all the service data flows or has an EPS bearer configured to perform an operation equivalent to the operation. In this case, the UE B 502 may generate or transmit a message corresponding to the resource request to receive the sponsored data service provided from the UE A 500. If a domain name or URI, instead of IP address/port information (that is, IP 5-tuple) of servers which the UE B 502 is to connect to receive the sponsored data service, is included in the sponsoring service-related information received from the $3^{rd}$ party server 504, then the UE B 502 may transmit, through the TFA, an address of a web server the UE B 502 has accessed.

The MME 506 then starts operations for generating or modifying a bearer context with other core network nodes based on the resource request received from the UE B 502. Thus, in operation 528, the MME 506 generates a bearer resource command and transmits the generated bearer resource command to an S-GW (not illustrated). The bearer resource command may include information included in the resource request, for example, a PCO and a service flow descriptor. The service flow descriptor may be included in the form of a Traffic Aggregate Description (TAD). The TAD may include information for identifying packet filters included in the service flow descriptor, for example, IP 5-tuple. If the TAD arrives at the S-GW, the S-GW delivers the TAD to the P-GW 508.

In operation 530, the P-GW 508 transmits a policy establish request for generating or modifying an IP-Connectivity Access Network (CAN) for the PCC rule of the UE B 502 to a PCRF 510 by using the information received through the TAD. The policy establish request uses a diameter protocol and may use one of commands such as 'AA request', 'Accounting request', 'Credit-Control request', 'Re-Auth request', and the like. The policy establish request may include information for the sponsored data service, that is, an access token. If the access token and a MAC are separated, the policy establish request includes both the access token and the MAC. The policy establish request may include a service flow descriptor, TFT (Traffic Flow Template) information, or packet filter information, for example, received through the TAD, as information for describing a service flow for the UE B 502. The policy establish request may further include a PLMN ID of a target common carrier. The service flow descriptor may include at least one of IP 5-tuple corresponding to an IP address, a port, or the like to which a service is to be provided, a domain name, an application ID, and a URI.

In operation 532, the PCRF 510 generates a PCC rule for providing the sponsored data service to the UE B 502 or updates an existing PCC rule, based on the information acquired from the policy establish request. In this process, the PCRF 510 determine whether the access token out of the information acquired from the policy establish request is valid. More specifically, the PCRF 510 searches, by using at least one of the sponsor ID and the ASP ID included in the policy establish request, for security information for determining whether the access token for an entity providing the sponsored data service and the sponsoring service request of the UE B 502 are valid, and determines validity (or integrity) of the received access token and of the UE B 502 by using the searched security information. In the determination process, the PCRF 510 searches for the stored security information, for example, the above-described shared key or a certificate of authentication, by using at least one of the sponsor ID and the ASP ID included in the access token, and generates a MAC by using the searched security information and access token. Thereafter, the PCRF 510 compares the generated MAC with the MAC acquired from the policy establish request to verify validity of the access token and of the sponsoring service requests of the UE B 502. Herein, the MAC acquired from the policy establish request may be included in the access token or may be acquired in the form of a separate information element. Herein, the PCRF 510 delivers the access token acquired from the policy establish request to a separate server (not illustrated) in charge of access token authentication, for example, an Authentication Authorization Accounting (AAA) server. If separately receiving an MAC through the policy establish request, the PCRF 510 also transmits the received MAC to the AAA server. The AA server then determines validity of the received access token and delivers the determination result to the PCRF 510.

Suppose that the PCRF 510 determines that the access token acquired from the policy establish request and the sponsoring service request of the UE B 502 are valid in operation 532. Then, the PCRF 510 newly generates or updates a PCC rule including information for the sponsored data service. Herein, the information for the sponsored data service may be generated using a charging key used for a particular sponsor and an ASP. Then, in operation 534, the PCRF 510 delivers the newly generated or updated PCC rule to the P-GW 508. The PCC rule may be configured in the form of a message using the diameter protocol. The message may use one of commands such as 'AA answer', 'Accounting answer', 'Credit-Control answer', 'Re-Auth answer', and the like. The message includes a charging key for separate charging with respect to the sponsored data. The charging key for the sponsored data service is not allocated to each user, but may be allocated to be shared between the particular sponsor and the ASP.

The message corresponding to the PCC rule may include information for identifying an SDF to which sponsored charging is applied. If use of a data service other than the sponsored data service is not allowed for the UE B 502, a service descriptor may be configured such that a gate is blocked for an SDF other than the SDF to which the sponsored charging is applied.

It is assumed that a domain name or a URI list, instead of IP address/port information, is included in a service flow descriptor included in the access token received from the UE B 502 through the PCO. In this case, the P-GW 508 may receive and check an inquiry request for a Domain Name System (DNS) or a response to the inquiry request which are sent from the UE B 502. If a domain name requested from the UE B 502 is included in the domain name or the URI list included in the service flow descriptor, the P-GW 508 performs an operation for adding responded IP address information to packet filters capable of identifying sponsored traffic, that is, an SDF template of a PCC rule for the sponsored data service. Herein, IP address information may include an IP address, and if necessary, an additional port number. To add the responded IP address information to the SDF template of the PCC rule, the P-GW 508 may add the packet filters without information exchange with the PCRF 510. According to another embodiment, the P-GW 508 may send a request for adding the IP address information to the PCC rule for the sponsored data service to the PCRF 510.

The P-GW 508 then starts charging and traffic control according to the received PCC rule. In particular, for the sponsored data, the P-GW 508 charges a sponsor by using the received charging key, instead of performing general charging. Suppose that use of a particular data service is not allowed for the UE B 502, for example, any data service other than the sponsored data service is blocked. In this case, the P-GW 508 may also perform traffic control according to a gate state of the received PCC rule.

If generation or modification of an EPS bearer for the sponsored data service is needed, the P-GW 508 may trigger a process for generating or modifying the EPS bearer from the MME 506. Thus, after generating and modifying the EPS bearer, the P-GW 508 notifies the UE B 502 of the generation and modification of the EPS bearer through the MME 506 in operations 536 and 538. In these operations, packet filters for the sponsored data service generated by the P-GW 508 may be installed in the UE B 502. If use of a particular data service is not allowed, for example, any data service other than the sponsored data service is blocked, packet filters configured to allow packet transmission and reception for an IP flow corresponding to the sponsored data service may be installed in the UE B 502. Thereafter, in operation 540, the UE B 502 uses the sponsored data service provided corresponding to the PCC rule. If receiving additional information for the sponsored data service, the UE B 302 displays the information on a screen to indicate the received additional information to a user. The UE B 502 displays the received information to the user through a display screen.

In the above-described embodiments and following embodiments to be described, an access token may include detailed information for the sponsored data service. For example, the access token may include information indicating a user's class. Suppose that the user of the UE B 502 has a particular service class or a priority for a web service received based on the sponsored data service. Then, the UE B 502 may be provided with a different sponsored data service according to a service class or a priority. To this end, an access token issued by a service provider to a user has a different value for a different service class and a UE having received the access token delivers the access token to a common carrier network. A P-GW, which is one of core network nodes, may identify the class of the user based on the value of the received access token. The P-GW may also provide characteristic of the sponsored data service, for example, a maximum allowed amount of data, an allowed time, or a charging method, differently according to the identified class of the user. More specifically, the P-GW may provide the sponsored data service of up to 1 GB if the class of the user of the UE B 502 is higher than a predetermined class, and may provide the sponsored data service of up to 200 MB if the class of the user of the UE B 502 is lower than the predetermined class.

In the embodiment of FIGS. 5A and 5B, the P-GW 508 transmits the access token received through the PCO to the PCRF 510, and the PCRF 510 verifies and uses the access token. However, in another embodiment, the P-GW 508 may directly process the received access token and transmit information to the PCRF 510 for generation or update of the PCC rule.

In a modification of the embodiment of the FIGS. 5A and 5B, if the UE A 500 provides the sponsoring service to the UE B 502 by using a part of an available amount of the data service of the UE A 500, the sponsored data service is provided to the UE B 502 through the same process as in the embodiment of FIGS. 5A and 5B, and the UE A 500 may subtract the amount of the sponsored data service to be provided to the UE B 502 and set the remaining available amount of the data service as a current available amount of the data service of the UE A 300, thus modifying the PCC rule. An access token including the remaining available amount of the data service is generated and delivered to the UE A 500, and the operations performed with respect to the UE B 502 after operation 520 of FIG. 5A may be performed with respect to the UE A 500 based on the access token. Thus, the UE A 500 uses the data service according to the remaining available amount of the data service.

In another modification of the embodiment of FIGS. 5A and 5B, an embodiment that is the same as the modification of the embodiment of FIGS. 3A and 3B where the charging key is not used may be considered. Operations of this embodiment are also the same as those in the modification of the embodiment of FIGS. 3A and 3B and thus will not be described again.

In further another modification of the embodiment of FIGS. 5A and 5B, an address of a web service may be additionally delivered. Operations in this embodiment are also the same as in the modification of the embodiment of FIGS. 4A and 4B and thus will not be described again. Herein, the access token is information configured in a format pre-agreed between a service provider and a common carrier, and may be information issued by the common carrier and delivered in advance to the service provider. Depending on an embodiment, a part of the access token may include information indicating that use of the sponsored data service by the UE is allowed, and may also include information indicating characteristics (a maximum allowed amount of data, an allowed time, a service type, and the like) of the sponsored data.

In still another modification of the embodiment of FIGS. 5A and 5B, the UE A 500 may provide a sponsoring service to a sponsored group rather than a single sponsored UE. Operations in this embodiment are the same as in the modification of the embodiment of FIGS. 3A and 3B and thus will not be described again. If the sponsoring service is provided to the sponsored group in this way, an access token is generated and delivered to each of target UEs of the sponsored group in the same manner in operations 520 through 524. Operations 532 through 534 are the same as operations 326 through 330 of FIGS. 3A and 3B and thus will not be described again.

In yet another modification of the embodiment of FIGS. 5A and 5B, the PCRF 510 of the common carrier network may identify an IP flow or an SDF for which the sponsored data service is targeted. In this embodiment, operations other than an operation of delivering, from the service provider server to the PCRF 510 of the common carrier network through the access token, lists of address information (addresses, ports, and the like) for use in providing the service are the same as in the modification of the embodiment of FIGS. 3A and 3B, and thus will not be described again.

Figure 6A:
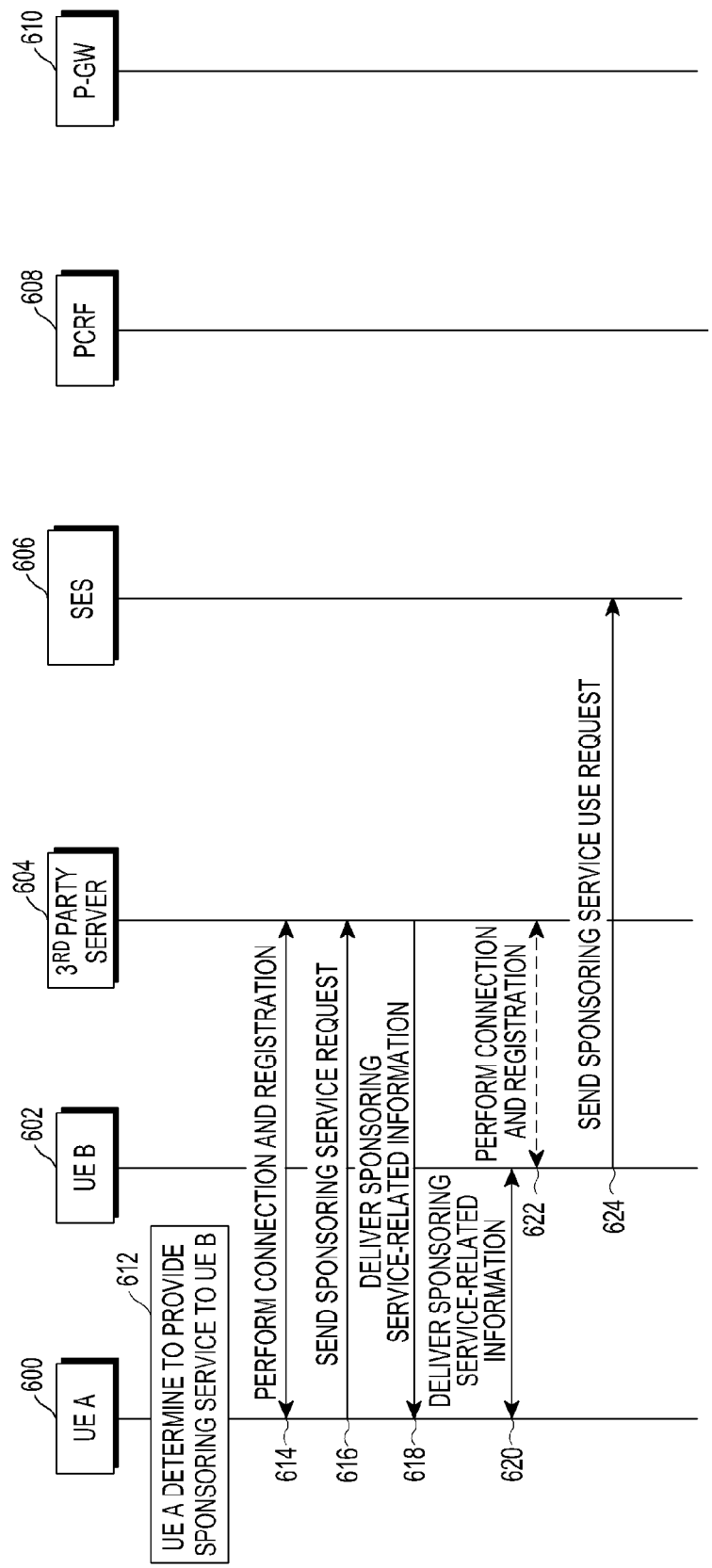
FIGS. 6A and 6B illustrate an operating flow for directly delivering, by a UE desiring to provide a sponsoring service, sponsoring service-related information to a sponsored UE according to an embodiment of the present disclosure.
Figure 6B:
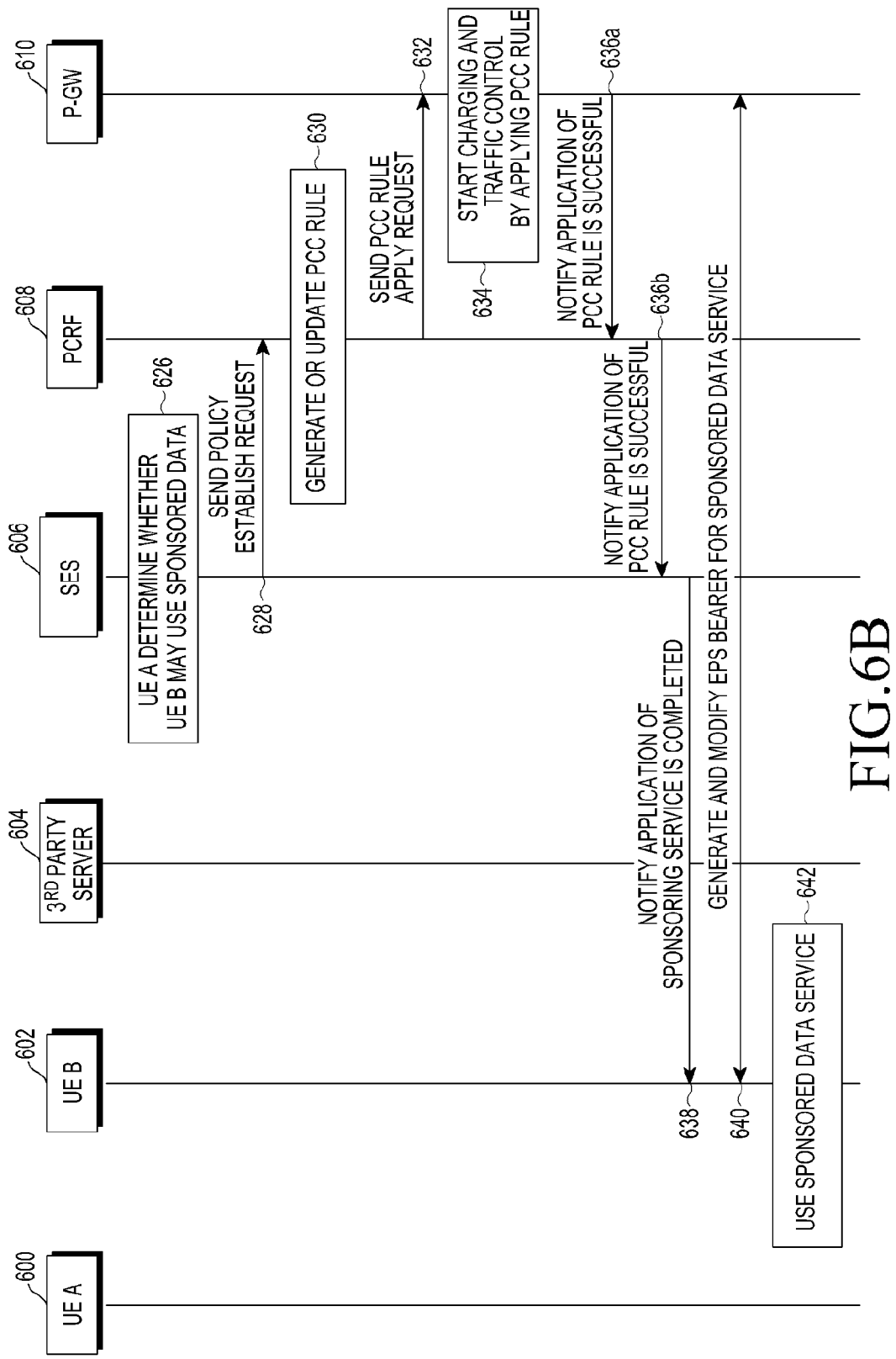

FIGS. 6A and 6B illustrate an operating flow for directly delivering, by a UE desiring to provide a sponsoring service, sponsoring service-related information to a sponsored UE according to an embodiment of the present disclosure.

Referring to FIGS. 6A and 6B, to provide a sponsoring service to a UE B 602, in operations 612 through 616, a UE A 600 connects to and is registered in a 3$^{rd}$ party server 604 and sends a sponsoring service request to the 3$^{rd}$ party server 604. Operations 612 through 616 are the same as operations 414 through 418 of FIGS. 4A and 4B and thus will not be described again.

In operation 618, the 3$^{rd}$ party server 604 sponsoring service-related information to the UE A 618. Herein, the sponsoring service-related information may be configured in the form of a message using 'HTTP GET', 'POST', or 'PUT' method. The message may also include an access token indicating that the connection of the UE B 602 to the common carrier network and the use of the sponsored data service by the UE B 602 are allowed. The message may also include an ID of the UE A 600, a sponsor ID, an ASP ID, and a PLMN ID of a target common carrier. In the embodiment of FIGS. 6A and 6B, for convenience, the access token is used in a form separated from other information, but the sponsoring service-related information may also be used in a form included in the access token. The access token has the above-described characteristics, and may be used in a form maintaining security according to a rule agreed between the $3^{rd}$ party server 604 and the common carrier network. Methods for this end have already been described with reference to FIGS. 4A and 4B and thus will not be described again.

In operation 620, the UE A 600 directly delivers the sponsoring service-related information acquired from the $3^{rd}$ party server 604 to the UE B 602. The sponsoring service-related information may be delivered through a safe channel between UEs, including short-range communication or IP communication. Then, in operation 622, the UE B 602 connects to and is registered in the $3^{rd}$ party server 604, and performs determination with respect to the sponsoring service. In the registration process, like in operation 422b of FIGS. 4A and 4B, connection to and registration in the $3^{rd}$ party server 404 may be performed using a temporary URI relatively simply through simple authentication. Operation 622 may be selectively performed. That is, if the UE B 402 has already been registered in the $3^{rd}$ party server 604, a separate registration process may be omitted.

In operation 624, the UE B 602 sends a sponsoring service use request to an SES 606 through the common carrier network. Herein, a message corresponding to the sponsoring service use request is encoded in the same form as and is delivered in the same message format including the same information as in operation 426 of FIGS. 4A and 4B, and thus will be described again. In operation 626, the SES 606 determines, based on information acquired from the message corresponding to the received sponsoring service use request, whether the UE B 602 may use the sponsored data. In the determination process, the SES 606 may use the entire access token delivered from the UE B 402 or a part of the access token. The SES 606 may exchange information for additional authentication and security with the UE B 602.

If determining that the UE B 602 may use the sponsored data service, the SES 606 sends a policy establish request for starting the sponsored data service to the PCRF 608. Herein, the policy establish request is configured identically to the policy establish request of operation 326 of FIGS. 3A and 3B and thus will not be described again.

In operation 630, the PCRF 608 newly generates or updates a PCC rule including information for the sponsored data, based on the policy establish request. In operation 632, the PCRF 608 delivers a PCC rule apply request including the newly generated or updated PCC rule to a P-GW 610. The PCC rule apply request is configured identically to the PCC rule apply request of operation 328 of FIGS. 3A and 3B, and thus will not be described again. In operation 634, the P-GW 610 starts charging and traffic control corresponding to the received PCC rule. The P-GW 610 delivers a response notifying the requested application of the PCC rule is successful, to the UE B 602 through the PCRF 608. In operation 640, the P-GW 610 triggers the UE B 602 to generate or modify the EPS bearer for the sponsored data service. In operation 642, the UE B 602 uses the sponsored data service corresponding to previously received sponsoring data characteristic information. Subsequent operations including operation 630 of FIGS. 6A and 6B are the same as operation 330 and subsequent operations of FIGS. 3A and 3B, and thus will not be described again.

In modification of the embodiment of FIGS. 6A and 6B where the UE A 602 directly delivers the sponsoring service-related information acquired from the $3^{rd}$ party server 604 to the UE B 602 to which the sponsoring service is to be provided in operation 620, the UE A 600 may provide the sponsoring service to the UE 602 by using a part of the available amount of the data service of the UE A 600. In this embodiment, operations subsequent to operation 620 are the same as in modification of the embodiment of FIGS. 4A and 4B where the UE A 400 provides the sponsoring service to the UE B 402 by using a part of the available amount of the data service of the UE A 400, and thus will not be described again.

In another modification of the embodiment of FIGS. 6A and 6B, a charging key may not be used. In this embodiment, operations subsequent to operation 620 of FIGS. 6A and 6B are the same as in modification of the embodiment of FIGS. 4A and 4B in which the charging key is not used, and thus will not be described again.

In further another modification of the embodiment of FIGS. 6A and 6B, an address of a web service may be additionally delivered. In this embodiment, in operation 620, the UE A 600 directly delivers the sponsoring service-related information acquired from the $3^{rd}$ party server 604 to the UE B 602. Subsequent operations are the same as in modification of the embodiment of FIGS. 4A and 4B in which the charging key is not used, and thus will not be described again.

In still another modification of the embodiment of FIGS. 6A and 6B, the UE 600 may provide a sponsoring service to a group of multiple UEs, for example, a group of friends or a group of wearable devices of a user. In this embodiment, operations other than operation 620 are the same as in modification of the embodiment of FIGS. 4A and 4B where the sponsoring service is provided to a group, and thus will not be described again.

Figure 7A:
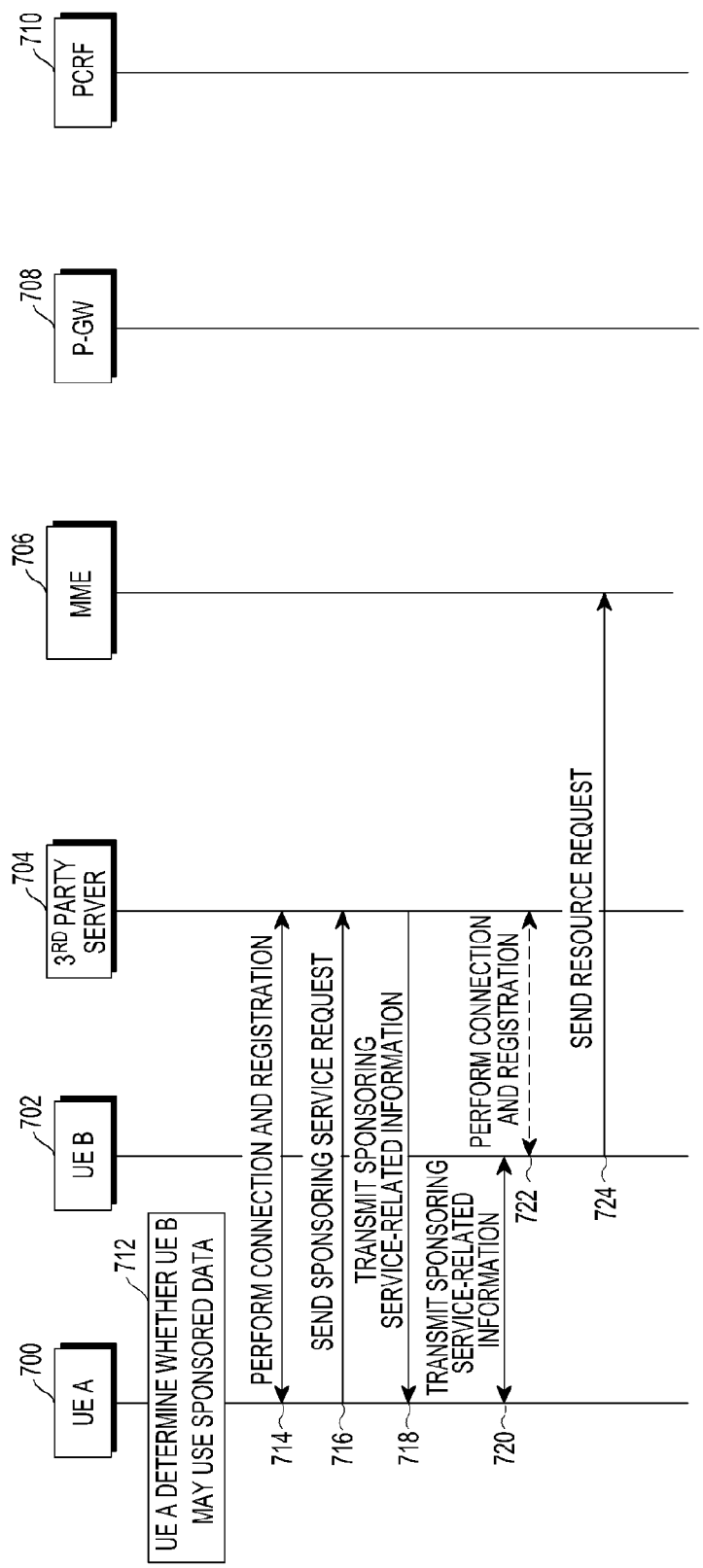
FIGS. 7A and 7B illustrate an operating flow for transmitting, by a sponsored UE, sponsoring service-related information directly received from a UE providing a sponsoring service to a core network node by using a PCO according to an embodiment of the present disclosure.
Figure 7B:
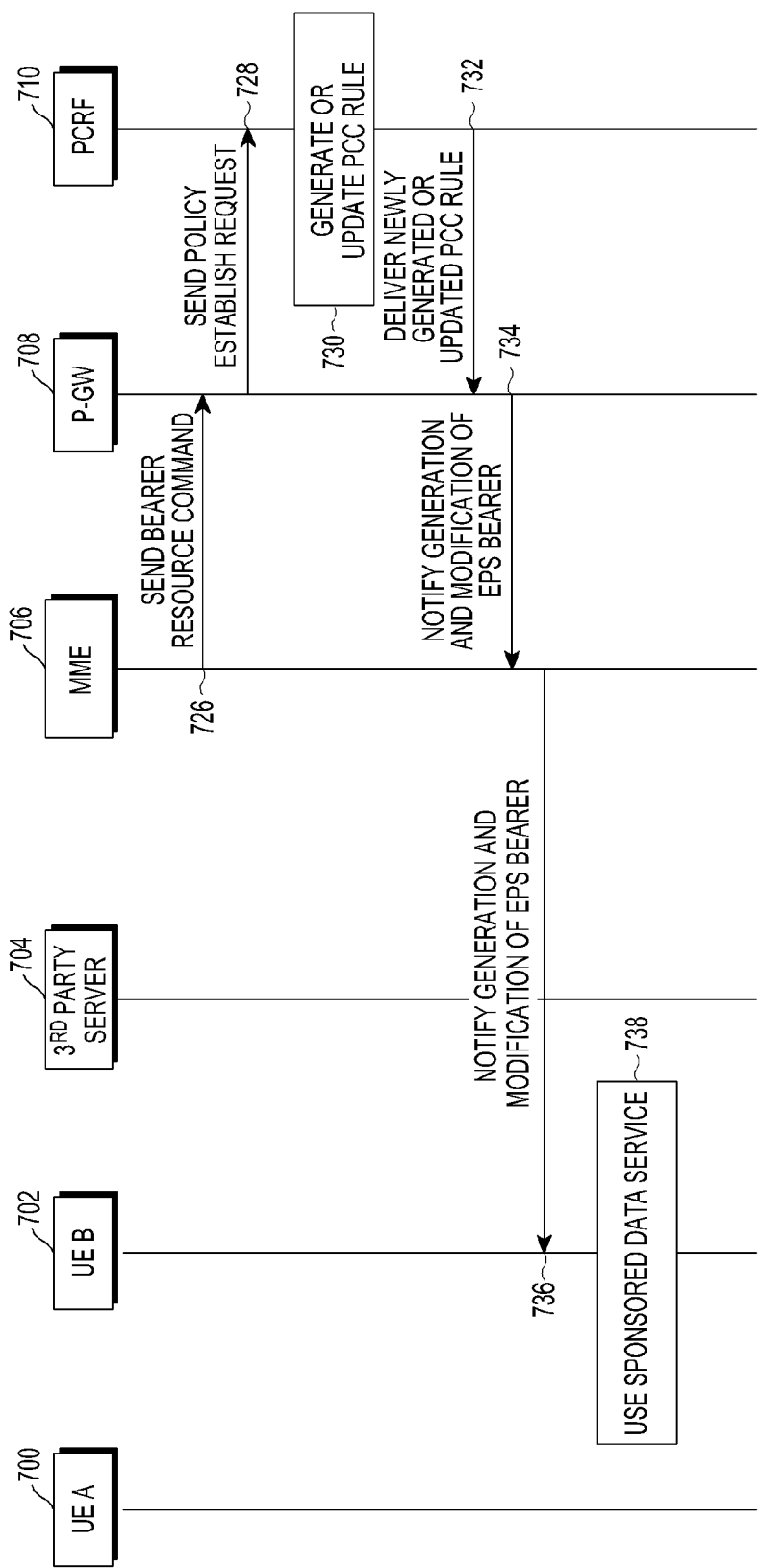

FIGS. 7A and 7B illustrate an operating flow for transmitting, by a sponsored UE, sponsoring service-related information directly received from a UE providing a sponsoring service to a core network node by using a PCO according to an embodiment of the present disclosure.

Referring to FIGS. 7A and 7B, operations 712 through 720 are the same as operations 612 through 620 of FIG. 6A. Thus, in operation 720, the UE A 700 directly delivers the sponsoring service-related information acquired from the $3^{rd}$ party server 704 to a UE B 704. The direct delivery may be performed through a secure channel between UEs, including short-range communication or IP communication. Then, in operation 722, a UE B 702 connects to and is registered in the $3^{rd}$ party server 704, and performs determination with respect to the sponsoring service. The registration process is performed identically to operation 622 of FIG. 6A.

In operation 724, the UE B 702 sends a resource request for receiving the sponsored data service to a core network node of a common carrier, for example, to an MME 706. Herein, the resource request may be configured identically to operation 526 of FIG. 5A. Thus, the resource request may be transmitted in the form of a bearer resource allocate request or bearer resource modify request message including the sponsoring service-related information received from the $3^{rd}$ party server 704. Depending on an embodiment, the sponsoring service-related information may be transmitted through a PCO of a message corresponding to the resource request. Operations 726 through 738 are the same as operations 528 through 540 of FIGS. 5A and 5B and thus will not be described again. Through these operations, the UE B 702 is notified through the PCRF 710, the P-GW 708, and the MME 706 that the PCC rule is applied based on the access token received through the PCO, and uses a received web service based on the sponsored data service.

In the embodiment of FIGS. 7A and 7B, the UE A 700 may provide the sponsoring service of the UE B 702 by using a part of the available amount of the data service of the UE A 700. In this embodiment, operations following operation 720 are the same as in modification of the embodiment of FIGS. 5A and 5B where the UE A 500 provides the sponsoring service to the UE B 502 by using a part of the available amount of the data service of the UE A 500, and thus will not be described again.

In modification of the embodiment of FIGS. 7A and 7B, the charging key may not be used. Also in this embodiment, operations subsequent to operation 720 are the same as in modification of the embodiment of FIGS. 5A and 5B where the charging key is not used, and thus will not be described again.

Meanwhile, in the embodiments of the present disclosure, charging of a sponsored data service is changed according to agreement between a service provider and a common carrier and at the request of a user. However, this description is used in a general sensitive to easily describe technical matters of the present disclosure and to help understanding of the present disclosure, rather than to limit the scope of the present disclosure. In an embodiment of the present disclosure, sponsored data and a policy for applying the sponsored data may include traffic control as well as charging. Traffic control includes Quality of Service (QoS) control. Thus, in embodiments of the present disclosure, a user may receive a sponsored data service and may be provided with a sponsored data service supporting a particular QoS as well as charging. For example, if a user is provided with a particular web service as a sponsored data service, a service that does not apply the sponsored data service or a better QoS than another user to which the service is not applied may be guaranteed.

In embodiments of the present disclosure, it is described that an access token, a service, and sponsor-related information, for example, a sponsor ID, an ASP ID, a PLMN ID, and a service flow descriptor are delivered as separate information elements. However, this embodiment is an example, and service and sponsor-related information may be encoded and delivered through one access token.

Figure 8:
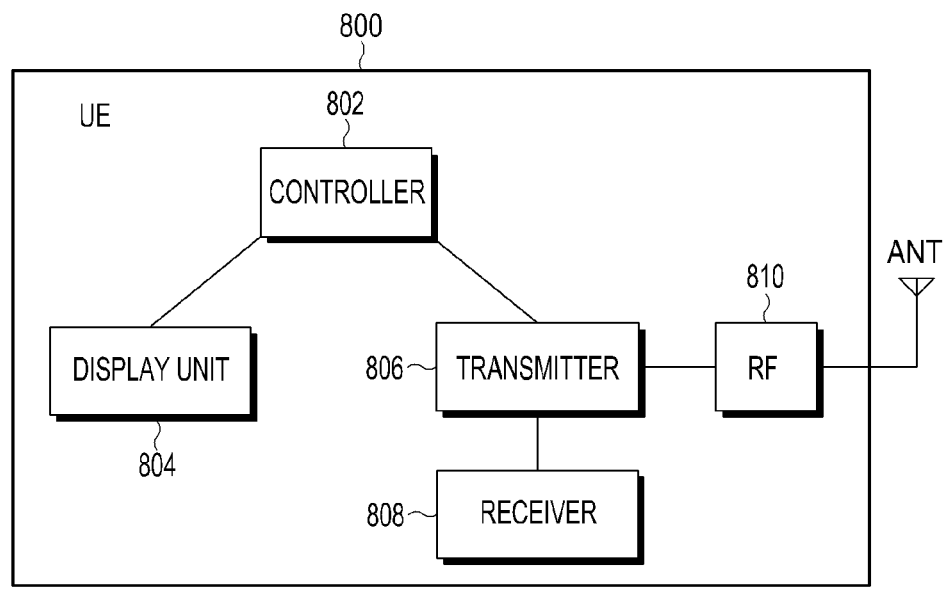
FIG. 8 is a block diagram of an UE of a user providing a sponsoring service according to an embodiment of the present disclosure.

FIG. 8 is a block diagram of an UE of a user providing a sponsoring service according to an embodiment of the present disclosure.

Referring to FIG. 8, a UE 800 includes, for example, a controller 802, a display unit 804, a transmitter 806, a receiver 808, and radio frequency (RF) processor 810. Here, the structure of the UE 800 is merely an example of a schematic structure according to this disclosure for the convenience of the description, and can be a sub divisible structure or a different structure according to an intention of an enterpriser or the embodiments.

Firstly, the receiver 808 is configured to receive an input signal from the user. The display unit 804 may be electrically connected to the receiver 808 and the controller 802. The display unit 804 may also be configured to display the input signal, according to a control of the controller 802. Further, the controller 802 may also be electrically connected to the receiver 808 and the display unit 804. Similarly, the controller 802 may also be configured to determine at least one UE provided the sponsoring service, and access and register into a service providing server (e.g. $3^{rd}$ party server 404) for a sponsoring service.

The transmitter 806 is electrically connected to the controller 802. The transmitter 806 may also be configured to transmit a request of the sponsoring service to the service providing server, according to a control of the controller 802. The request of the sponsoring service may include any combination of identification information of the at least one UE, identification information of the service providing server, identification information of communication network of the at least one UE, and characteristic information of the sponsoring service.

Figure 9:
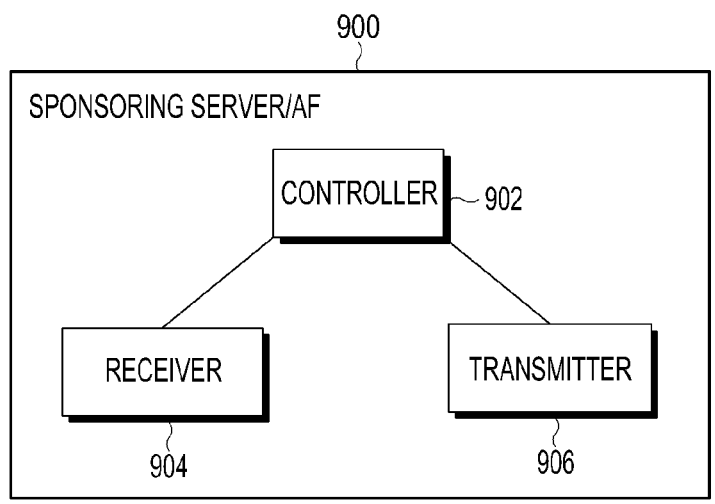
FIG. 9 is a block diagram of a sponsoring server of a UE according to an embodiment of the present disclosure.

FIG. 9 is a block diagram of a sponsoring server of a UE according to an embodiment of the present disclosure.

Referring to FIG. 9, a sponsoring server 900 includes, for example, a controller 902, a receiver 904, and a transmitter 906. Here, the structure of the sponsoring server 900 is merely an example of a schematic structure according to this disclosure for the convenience of the description, and can be a sub-divisible structure or a different structure according to an intention of an enterpriser or the embodiments.

The receiver 904 is configured to receive a request for use of sponsoring service from at least one second UE determined by a first UE providing the sponsoring service. The controller 902 may be electrically connected to the receiver 904. In some embodiments, the controller 902 is configured to determine whether the at least one second UE may use the sponsoring service, and the transmitter 906 may be electrically connected to the controller 902. If the at least one second UE may use the sponsoring service, the transmitter 906 is configured to transmit a policy establish request of the sponsoring service to a policy establish server, by a control of the controller 902. In such a case, the request for use of the sponsoring service comprises information related to the sponsoring service, obtained by at least one second UE from a service providing server corresponding to the sponsoring service, wherein the information related to the sponsoring service is configured according to a format predetermined between a service provider of the sponsoring server 900 corresponding to the sponsoring service and a provider of a communication network of the at least one second UE. The information related to the sponsoring service comprises one of identification information of the first UE, identification information of the service providing server, identification information of the communication network, and characteristic information of the sponsoring service.

If a notification for completion of the requested policy establish, is received from the policy establish server, the transmitter 906 is configured to transmit the notification to the at least one second UE, according to a control of the controller 902.

Figure 10:
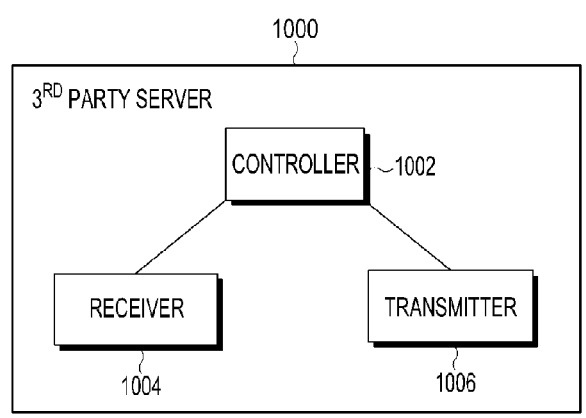
FIG. 10 is a block diagram of a service providing server for providing service corresponding to a sponsoring service provided by a UE according to an embodiment of the present disclosure.

FIG. 10 is a block diagram of a service providing server for providing service corresponding to a sponsoring service provided by a UE according to an embodiment of the present disclosure.

Referring to FIG. 10, a service providing server 1000 includes, for example, a controller 1002, a receiver 1004, and a transmitter 1006. Here, the structure of the service providing server 1000 is merely an example of a schematic structure according to this disclosure for the convenience of the description, and can be a sub divisible structure or a different structure according to an intention of an enterpriser or the embodiments.

The controller 1002 is configured to access and register with a first UE providing the sponsoring service. The receiver 1004 may be electrically connected to the controller 1002. Further, the receiver 1004 may be configured to receive a request of the sponsoring service from the first UE.

The transmitter 1006 may be electrically connected to the controller 1002. Further, the transmitter 1006 may also be configured to transmit a request of generation notification of the sponsoring service to a second server, according to a control of the controller 1002. In such a case, at least one second UE, as determined by the first UE, is provided with the sponsoring service. The second server may also be configured to transmit the generation notification as a format of SMS, MMS or push service, to the at least one second UE. In such a case, the second server can also be deployed in the service providing server, or can be configured as an external server. The transmitter 1006 may be configured to transmit information related to the sponsoring service to the at least one second UE, according to a control of the controller 1002 when the receiver 1004 has received a permission for using the sponsoring service from the at least one second UE. The information related to the sponsoring service may include one of identification information of the first UE, identification information of the service providing server, identification information of the communication network for the at least one second UE, and characteristic information of the sponsoring service. The transmitter 1006 may also be configured to transmit the information related to the sponsoring service to the at least one second UE. The information related to the sponsoring service is configured according to a format predetermined between a service provider of the service providing server and a provider of the communication network.

A method and apparatus for providing a sponsoring service between UEs in a communication system according to an embodiment of the present disclosure may be embodied as hardware, software, or a combination of hardware and software. The software may be stored in a volatile or non-volatile storage device such as, regardless of whether erasable or rewritable, a Read Only Memory (ROM) or the like, a memory such as a Random Access Memory (RAM), a memory chip, a device, an integrated circuit, or the like, or an optically or magnetically recordable and machine (e.g., computer)-readable storage medium such as a Compact Disk (CD), a Digital Versatile Disk (DVD), a magnetic disk, a magnetic tape, or the like. The method according to the present disclosure may be implemented by a computer or a portable terminal including a controller and a memory, and the memory may be an example of a machine-readable storage medium suitable to store a program or programs including instructions for implementing embodiments of the present disclosure.

Thus, the present disclosure includes a program including a code for implementing the apparatus or method of claims and a machine (computer)-readable storage medium storing the program. The program may be electronically transferred through an arbitrary medium such as a communication signal delivered through wired or wireless connection and the present disclosure properly includes equivalents thereto.

In an embodiment of the present disclosure, the program may be received from an apparatus for providing and receiving a sponsoring service between UEs in a communication system and stored. The program providing apparatus may include a program including instructions for implementing the preset method by the apparatus, a memory for storing information for the method, a communication unit for performing wired or wireless communication with the apparatus, and a controller for transmitting the program to a transceiving apparatus at the request of the apparatus or automatically.

According to the present disclosure, detailed schemes for providing, by a user, a sponsoring service to at least one designated other users are proposed, thereby charging the at least one other users for the sponsored service or providing or giving the sponsored service to the at least one other users as a present.

While exemplary embodiments of the present disclosure have been disclosed in the specification and the drawings and specific terms have been used, these terms have been used in a general sense to easily describe the technical matters of the present disclosure and to help understanding of the present disclosure, rather than to limit the scope of the present disclosure. It would be obvious to those of ordinary skill in the art that other modified examples based on the technical spirit of the present disclosure are possible in addition to the disclosed embodiments.

In the above-described embodiments, all operations may be selectively performed or may be skipped. In each embodiment, operations may not be necessarily performed in order or may be performed in reverse order. Meanwhile, embodiments disclosed herein merely propose particular examples for easily describing the technical matters of the present disclosure and helping understanding of the present disclosure, rather than for limiting the scope of the present disclosure. That is, it would be obvious to those of ordinary skill in the art that other modified examples based on the technical spirit of the present disclosure are possible in addition to the disclosed embodiments.

What is claimed is:

1. A user equipment (UE) for providing a sponsoring service in a wireless communication system, the UE comprising:
    a transceiver; and
    a controller configured to:
        determine at least one UE to be provided with the sponsoring service,
        access to a server providing the sponsoring service,
        register identification information related to the sponsoring service to the server providing the sponsoring service,
        control the transceiver to:
            transmit a request of the sponsoring service comprising identification information of the at least one UE, and information of amount of data use for the sponsoring service, to the server providing the sponsoring service, and
            receive a notification notifying an application of the sponsoring service, the notification comprising information on allowed amount of data use, from the server providing the sponsoring service,
    wherein the allowed amount of data use corresponds to a policy and charging control (PCC) rule, which is updated based on the information of amount of data use, transmitted to the server providing the sponsoring service, for the sponsoring service.

2. The UE of claim 1, wherein the request of the sponsoring service further comprises at least one of identification information of the server providing the sponsoring service, identification information of communication network of the at least one UE, and characteristic information of the sponsoring service.

3. A server for providing a sponsoring service for a user equipment (UE) in a wireless communication system, the server comprising:
    a transceiver configured to receive a request of sponsoring service from at least one second UE indicated by a first UE providing the sponsoring service, the request comprising information of amount of data use for the sponsoring service; and a controller configured to identify whether the at least one second UE may use the sponsoring service or not, wherein the transceiver further configured to transmit a notification notifying an application of the sponsoring service, the notification comprising information on allowed amount of data use, and wherein the allowed amount of data use corresponds to a policy and charging control (PCC) rule, which is updated based on the information of amount of data use, transmitted to the server providing the sponsoring service, for the sponsoring service.

4. The server of claim 3, wherein the request of the sponsoring service comprises information related to the sponsoring service, obtained by the at least one second UE from a service providing server corresponding to the sponsoring service;

wherein the information related to the sponsoring service is configured according to a format predetermined between a service provider of the server for providing the sponsoring service and a provider of a communication network of the at least one second UE.

5. The server of claim 4, wherein the information related to the sponsoring service comprises one of identification information of the first UE, identification information of the server providing the sponsoring service, identification information of the communication network, and characteristic information of the sponsoring service.

6. The server of claim 4, wherein if a notification for completion of the requested policy configuration, is received from the server configured to configure the policy, the controller is configured to control the transceiver to transmit the notification for the completion of the requested policy configuration to the at least one second UE.

7. A server providing service corresponding to a sponsoring service provided by a user equipment (UE) in a wireless communication system, the server comprising:

a transceiver; and a controller configured to:
   access and register with a first UE providing the sponsoring service,
   control the transceiver to receive a request of the sponsoring service comprising identification information of the at least one UE and information of amount of data use for the sponsoring service, from the first UE; and
   a notification of notifying an application the sponsoring service, the notification comprising information on allowed amount of data use,
   wherein the allowed amount of data use corresponds to a policy and charging control (PCC) rule, which is updated based on the information of amount of data use transmitted to the server providing the sponsoring service, for the sponsoring service, and
   wherein at least one second UE, determined by the first UE, is provided with the sponsoring service.

8. The server of claim 7, wherein the controller is further configured to control the transceiver to transmit a request of generation notification of the sponsoring service to a second server, wherein the second server is configured to transmit the generation notification as a format of SMS (short messaging service), MMS (multimedia messaging service) or push service, to the at least one second UE.

9. The server of claim 7, wherein the controller is configured to control the transmitter to transmit information related to the sponsoring service to the at least one second UE recognized that the transceiver receives a permission for using of the sponsoring service from the at least one second UE;

wherein the information related to the sponsoring service comprises at least one of identification information of the first UE, identification information of a server providing the sponsoring service, identification information of the communication network for the at least one second UE, and characteristic information of the sponsoring service.

10. The server of claim 7, wherein the controller is configured to control the transmitter to transmit the information related to the sponsoring service to the at least one second UE, wherein the information related to the sponsoring service is configured according to a format predetermined between a service provider of the server providing the sponsoring service and a provider of the communication network.

11. A method by a user equipment (UE) for providing a sponsoring service in a wireless communication system, the method comprising:

determining at least one UE to be provided with the sponsoring service, accessing to a server providing the sponsoring service, and registering identification information related to the sponsoring service to the server providing the sponsoring service;

transmitting a request of the sponsoring service comprising identification information of the at least one UE and information of amount of data use for the sponsoring service to the server providing the sponsoring service; and receiving a notification notifying an application of the sponsoring service, the notification comprising information on allowed amount of data use, from the server providing the sponsoring service, wherein the allowed amount of data use corresponds to a policy and charging control (PCC) rule, which is updated based on the information of amount of data use, transmitted to the server providing the sponsoring service, for the sponsoring service.

12. The method of claim 11, wherein the request of the sponsoring service further comprises at least one of identification information of the server providing the sponsoring service, identification information of communication network of the at least one UE, and characteristic information of the sponsoring service.

13. A method by a server providing a sponsoring service for a user equipment (UE) in a wireless communication system, the method comprising:

receiving a request of sponsoring service from at least one second UE indicated by a first UE providing the sponsoring service, the request comprising information of amount of data use for the sponsoring service;

identifying whether the at least one second UE may use the sponsoring service or not; and transmitting a notification notifying an application of the sponsoring service, the notification comprising information on allowed amount of data use, wherein the allowed amount of data use corresponds to a PCC, policy and charging control, rule, which is updated based on the information of amount of data use, transmitted to the server providing the sponsoring service, for the sponsoring service.

14. The method of claim 13, wherein the request of the sponsoring service comprises information related to the sponsoring service, obtained by the at least one second UE from the server providing the sponsoring service;

wherein the information related to the sponsoring service is configured according to a format predetermined between a service provider of the server providing the sponsoring service and a provider of a communication network of the at least one second UE.

15. The method of claim 14, wherein the information related to the sponsoring service comprises one of identification information of the first UE, identification information of the server providing the sponsoring service, identification information of the communication network, and characteristic information of the sponsoring service.

16. The method of claim 14, wherein if a notification for completion of the requested policy configuration, is received from the server configured to configure the policy, transmitting the notification for completion of the requested policy configuration to the at least one second UE.

17. A method of a server providing service corresponding to a sponsoring service provided by a user equipment (UE) in a wireless communication system, the method comprising:

accessing and registering with a first UE providing the sponsoring service;

receiving a request of the sponsoring service comprising identification information of the at least one UE, and information of amount of data use for the sponsoring service, from the first UE; and transmitting a notification notifying an application of the sponsoring service, the notification comprising information on allowed amount of data use, wherein the allowed amount of data use corresponds to a policy and charging control (PCC) rule, which is updated based on the information of amount of data use, transmitted to the server providing the sponsoring service, for the sponsoring service, and wherein at least one second UE, determined by the first UE, is provided with the sponsoring service.

18. The method of claim 17, further comprising:

transmitting a request of generation notification of the sponsoring service to a second server, and wherein the generation notification is configured as a format of SMS (short messaging service), MMS (multimedia messaging service) or push service.

19. The method of claim 17, wherein if a permission for using of the sponsoring service from the at least one second UE is received, transmitting information related to the sponsoring service to the at least one second UE, and wherein the information related to the sponsoring service comprises at least one of identification information of the first UE, identification information of a server providing the sponsoring service, identification information of the communication network for the at least one second UE, and characteristic information of the sponsoring service.

20. The method of claim 17, further comprising:

transmitting the information related to the sponsoring service to the at least one second UE, and wherein the information related to the sponsoring service is configured according to a format predetermined between a service provider of a server providing the sponsoring service and a provider of the communication network.

* * * * *